US010233911B2

(12) United States Patent
Shani et al.

(10) Patent No.: US 10,233,911 B2
(45) Date of Patent: Mar. 19, 2019

(54) ENERGY HARVESTING SYSTEM

(71) Applicant: Energy Intelligence, Inc., Waban, MA (US)

(72) Inventors: Daniel Shani, Waban, MA (US); Nissim Shani, Waban, MA (US); Michael Hale, Hopewell Junction, NY (US); Mark Frost, Holmes, NY (US)

(73) Assignee: Energy Intelligence, Inc., Waban, MA (US)

( * ) Notice: Subject to any disclaimer, the term of this patent is extended or adjusted under 35 U.S.C. 154(b) by 0 days.

(21) Appl. No.: 15/019,734

(22) Filed: Feb. 9, 2016

(65) Prior Publication Data

US 2016/0230784 A1    Aug. 11, 2016

Related U.S. Application Data

(60) Provisional application No. 62/114,311, filed on Feb. 10, 2015.

(51) Int. Cl.
*F03G 7/00* (2006.01)
*F03G 7/08* (2006.01)

(52) U.S. Cl.
CPC ..................... *F03G 7/08* (2013.01)

(58) Field of Classification Search
CPC ................... F03G 7/08; F03G 7/00
(Continued)

(56) References Cited

U.S. PATENT DOCUMENTS 4,004,422 A * 1/1977 Le Van .............. F03G 7/08
  417/229
4,130,064 A * 12/1978 Bridwell ............ F04B 17/00
  104/154
(Continued)

FOREIGN PATENT DOCUMENTS

JP    2014137045        7/2014
JP    2014137045 A  *  7/2014
(Continued)

OTHER PUBLICATIONS

International Search Report and Written Opinion, PCT/US2016/017131, dated May 17, 2016.

*Primary Examiner* — Julio C. Gonzalez Ramirez

(57) ABSTRACT

Among other things, an integrated portable energy conversion mat is to be installed at a pavement surface over which a car or truck is to pass. The mat has a width at least as wide as the distance between the outermost edges of the treads of the tires located at an axle of the car or truck. The mat has a top surface over which the tires of the car or truck are to pass. The mat includes a sealed enclosed space housing and energy conversion system. The energy conversion system includes two sets of channels that extend along a length of the mat and contain hydraulic fluid under pressure. An energy converter converts energy carried by the hydraulic fluid in response to the tires of the car or truck passing over the top surface into electrical energy. An electrical port is coupled to the energy converter and exposed at an outer surface of the mat. The two sets of channels are spaced apart across the width of the mat by a distance that corresponds to the distance between the treads of the tires located at an axle of the car or truck. The energy converter is located within the sealed enclosed space of the mat and in the portion of the mat that is between the two sets of channels.

32 Claims, 24 Drawing Sheets

(58) Field of Classification Search
USPC .......... 290/1 R; 185/29, 33, 32, 27; 60/398, 60/698
See application file for complete search history.

(56) References Cited

U.S. PATENT DOCUMENTS

| | | | |
|---|---|---|---|
| 4,211,078 A | 7/1980 | Bass | |
| 4,339,920 A * | 7/1982 | Le Van | F03G 7/08 417/229 |
| 4,409,489 A * | 10/1983 | Hayes | F03G 7/08 290/1 R |
| 4,418,542 A * | 12/1983 | Ferrell | F04B 9/00 417/229 |
| 4,437,015 A * | 3/1984 | Rosenblum | F03G 7/08 290/1 R |
| 5,157,922 A * | 10/1992 | Baruch | F03G 3/00 417/229 |
| 6,091,159 A * | 7/2000 | Galich | F03G 7/08 290/1 R |
| 6,172,426 B1 * | 1/2001 | Galich | F03G 7/08 290/1 R |
| 6,204,568 B1 | 3/2001 | Runner | |
| 6,718,760 B1 | 4/2004 | Padera | |
| 6,756,694 B2 | 6/2004 | Rickettts | |
| 6,936,932 B2 | 8/2005 | Kenney | |
| 7,148,581 B2 | 12/2006 | Hershey et al. | |
| 7,315,088 B2 * | 1/2008 | Erriu | F03G 7/08 290/1 A |
| 7,371,030 B2 | 5/2008 | Hickman | |
| 7,530,761 B2 | 5/2009 | Kenney | |
| 7,541,684 B1 | 6/2009 | Valentino | |
| 7,629,698 B2 * | 12/2009 | Horianopoulos | F03G 7/08 290/1 R |
| 8,123,431 B2 | 2/2012 | Chen | |
| 8,232,661 B2 * | 7/2012 | Cannarella | F03B 13/148 290/1 R |
| 2005/0200132 A1 | 9/2005 | Kenny | |
| 2007/0020047 A1 * | 1/2007 | Adair | E01F 11/00 404/71 |
| 2007/0085342 A1 | 4/2007 | Horianopoulos et al. | |
| 2008/0224477 A1 * | 9/2008 | Kenney | F01D 17/26 290/1 R |
| 2010/0072758 A1 * | 3/2010 | Chang | H02K 7/1853 290/1 R |
| 2010/0072760 A1 * | 3/2010 | Anderson | B60G 13/14 290/1 R |
| 2010/0133855 A1 | 6/2010 | Daya | |
| 2010/0198412 A1 * | 8/2010 | Hendrickson | F15B 13/04 700/275 |
| 2010/0283255 A1 | 11/2010 | Hendrickson | |
| 2011/0215593 A1 * | 9/2011 | Chang | H02K 99/00 290/1 R |
| 2013/0009398 A1 | 1/2013 | Behnia et al. | |

FOREIGN PATENT DOCUMENTS

| | | |
|---|---|---|
| KR | 10-2012-0082724 | 7/2012 |
| WO | 2012142420 | 10/2012 |
| WO | 2013006832 | 1/2013 |

* cited by examiner

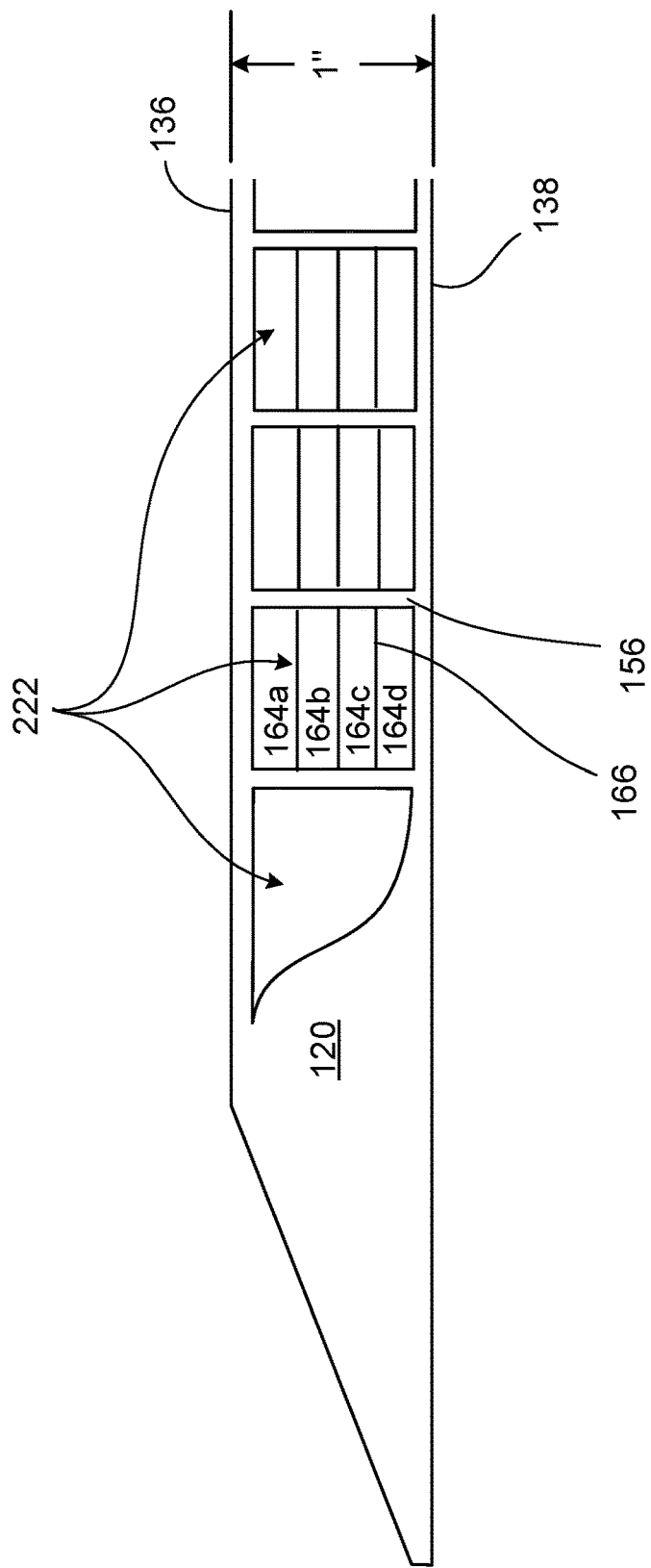

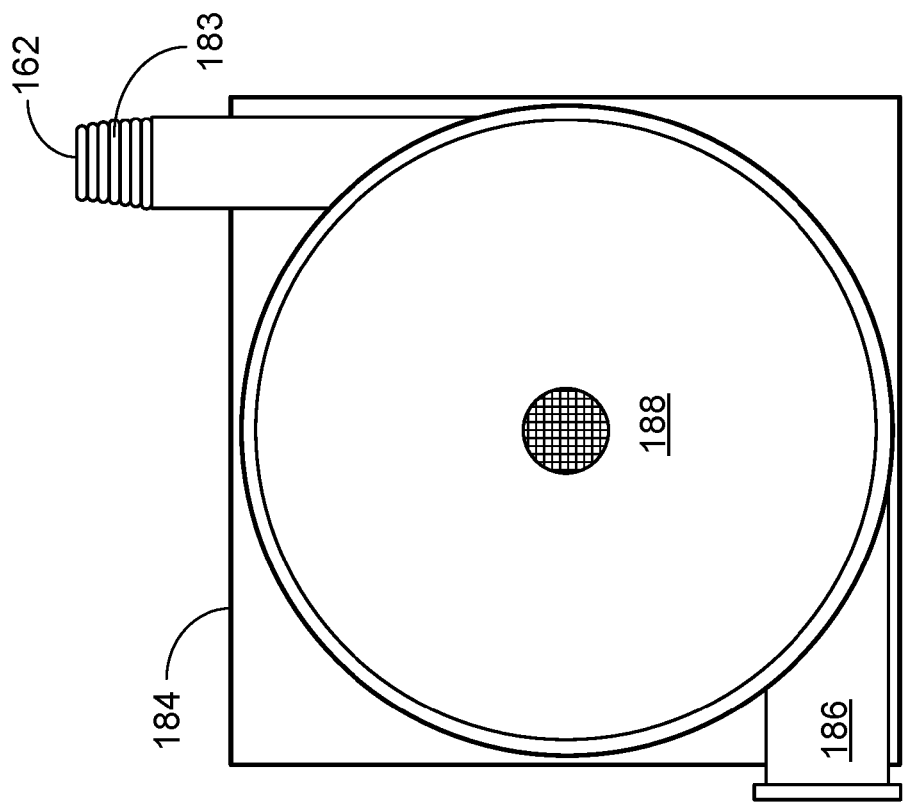
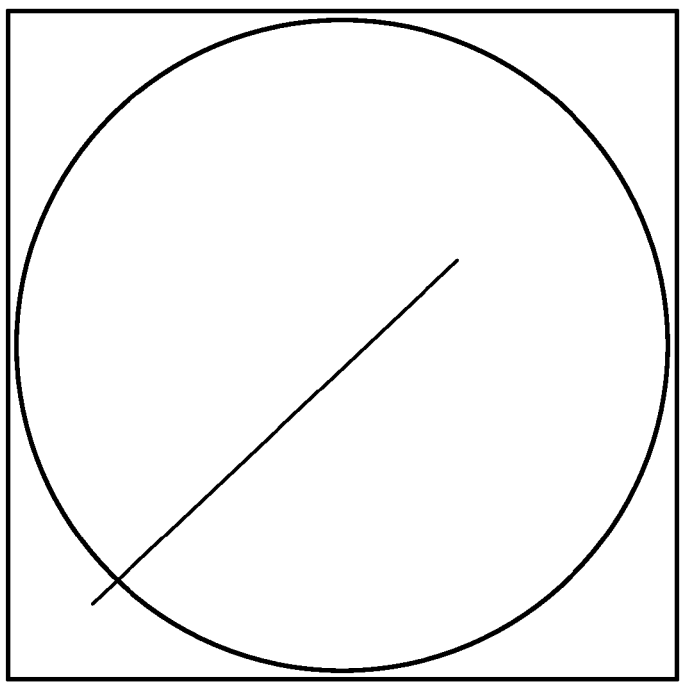
FIG. 14

ENERGY HARVESTING SYSTEM

CLAIM OF PRIORITY

This application claims priority to U.S. Patent Application Ser. No. 62/114,311, filed on Feb. 10, 2015, the entire contents of which are incorporated here by reference.

BACKGROUND

Energy conversion from kinetic energy to mechanical energy to electrical energy can be used to generate electricity.

SUMMARY

In general, in an aspect, a structure receives kinetic energy from a wheel of a vehicle or a foot of a pedestrian, and a hydraulic system transfers the received energy to an energy converter.

Implementations may include one or any combination of two or more of the following features. The energy converter is configured to convert energy carried by hydraulic fluid of the hydraulic system into a different form of energy. The different form of energy includes mechanical motion. The mechanical motion includes rotational motion. The mechanical motion includes linear motion. The energy converter is configured to convert the different form of energy into another form of energy. The other form of energy includes electricity. The energy converter includes an electric generator. The energy converter includes at least one of a turbine, an impeller, an axial generator, a gerotor, and an expandable bellows. The energy converter includes electricity distribution components.

There is a control system. The control system includes sensors associated with a surface on which the wheel of the vehicle or the foot of the pedestrian is traveling. The sensors sense at least one of weight and speed of the vehicle or pedestrian. The control system includes electronics that receive signals from the sensors and issue signals to control operation of at least one of the energy converter and the hydraulic system. The electronics improve energy efficiency of the operation of the apparatus based on the signals from the sensors. Wireless communication facilities communicate information associated with the operation of the energy converter or the hydraulic system or both. The wireless communication facilities are configured to communicate the information to or from at least one of sensors configured to sense data associated with operation of the apparatus, wireless data transmission devices, a remote server, a remote computing device, a real time data dashboard, and a computing device configured to analyze data associated with operation of the apparatus. Data management facilities manage data associated with the operation of the apparatus. The data management facilities include at least one of an emergency operation facility or a shutdown facility. The data management facilities include a real-time display representative of the operation of the apparatus. A machine learning system is configured to infer information about the vehicle or pedestrian and about other vehicles or pedestrians from which kinetic energy is being received. There is an interface configured to transmit data to or receive data from at least one of a remote server, a remote controller, or a remote performance monitor.

The energy converter includes a rotating element coupled to an electric generator. The energy converter includes a linear motion element coupled to an electric generator. The energy converter includes an inlet port to receive hydraulic fluid. The energy converter includes a housing. The energy converter includes a nozzle for hydraulic fluid of the hydraulic system. The energy converter includes a gerotor. The energy converter includes a dual-action linear hydraulic piston. The energy converter includes two or more energy conversion units in parallel or in series relative to the hydraulic system. The energy conversion units operate respectively with different operating characteristics. A sensor determines a characteristic of the vehicle or the pedestrian and provides a signal indicative of which energy conversion unit or units to activate. The energy converter includes an outlet port for hydraulic fluid of the hydraulic system. The energy converter includes elements to adjust the energy conversion structure dynamically to effect changes in operating characteristics. The elements include weights that slide along blades of an impeller depending on the rotational velocity of the impeller. The elements are configured to increase hydraulic pressures dynamically based on sensor signals. The energy receiving structure includes a surface on which the wheel of the vehicle or the foot of the pedestrian makes contact. The apparatus of claim configured to be mounted in or on a roadway. The energy transferred by the hydraulic system is in the range of 50 Watts to 5000 Watts under continuous operation. The hydraulic system includes a channel containing hydraulic fluid and having one end configured to enable compressed hydraulic fluid to apply a force to cause motion of the energy converter.

The hydraulic system includes a channel containing hydraulic fluid and having one end configured to apply force to the hydraulic fluid in response to the kinetic energy received from the wheel of the vehicle. The hydraulic system includes a channel containing hydraulic fluid and configured to apply a continuing force to pump the hydraulic fluid in a preferential direction in the channel as a wheel of the vehicle moves along the structure that receives kinetic energy from the wheel. The hydraulic system includes hydraulic channels containing pressurized hydraulic fluid and arranged so that the wheel of the vehicle or the foot of the pedestrian causes the hydraulic fluid to be pumped from an upstream end of the channels to a downstream end of the channels in a direction in which the vehicle or pedestrian is traveling. A manifold couples the channels at the downstream end. A port has a one-way valve for adding hydraulic fluid to the channels. A drain port has a one-way valve for draining fluid from the channels.

The hydraulic system includes a hydraulic shuttle path along which hydraulic fluid flows back and forth between two endpoints. The two endpoints are arranged so that one endpoint is nearer to an end of the apparatus that first receives the kinetic energy from the wheel of the vehicle or the foot of the pedestrian. The kinetic energy is transferred to the energy converter at a location that is between the two endpoints along the shuttle path. There is a bypass return path parallel to the shuttle path for the hydraulic fluid to return to the first endpoint. The second endpoint includes a device configured to receive the hydraulic fluid, such as an accumulator for the hydraulic fluid. The first endpoint includes ends of compressible channels. Each of the hydraulic channels extends in the direction in which the vehicle or pedestrian is traveling, and the channels are arranged side-by-side across a width of the apparatus in each of at least one set of channels.

The adjacent channels are separated by vertical walls. Each of the vertical walls has a thickness between 1/32 inch and 1/4 inch. The vertical walls are not stretchable. The vertical walls are non-elastic, flexible, and thin. The vertical walls are configured to bend when a force is applied to an upper surface of the apparatus. The vertical walls are have accordion bends. The vertical walls have a tensile strength between 16 megapascals and 100 megapascals. There are transverse features that are bendable in response to the force of the vehicle or the pedestrian. An aggregate width spanned by the hydraulic channels of one of the sets, across the width of the apparatus, is at least as wide as a tread of the wheel or the width of the shoe. The number of channels across the width of the apparatus is at least eight per foot. The width of each of the channels across the width of the apparatus is less than three inches. The width of each of the channels across the width of the apparatus is less than one inch. Each of the channels can withstand a pressure of up to 200 pounds per square inch of the hydraulic fluid in the channel. The hydraulic system at rest is pressurized at a pressure in the range of 2 pounds per square inch to 200 pounds per square inch.

There are two sets of channels separated by a section along a length of the apparatus that does not contain channels. At least part of the energy converter or part of the hydraulic accumulator or both are located in the section. A top forms upper walls of the channels. A bottom forms bottom walls of the channels. The vertical walls begin at first ends of the channels and seal the first ends of the channels from one another and end at a location spaced apart from second ends of the channels to enable hydraulic fluid to flow between the channels at the second ends. The second ends of the channels form an integrated port for the hydraulic fluid to flow to the energy converter. The cross-section of each of the channels varies along the length of the channel to tend to maximize flow of hydraulic fluid toward the energy converter and to maintain low or steady hydraulic pressures.

The channels are configured to undergo complete collapse of the chamber under the force of the vehicle or the pedestrian. Each of the channels is partitioned vertically into a stack of sub-channels. Each of the channels includes transverse features configured to tend to maximize the flow of hydraulic fluid toward the energy converter. The transverse features include a series of collapsible gates that cooperate to collapse in sequence as the vehicle or pedestrian moves across the apparatus. The gates include elements coupled to side or top walls or both of the channels. The gates include flaps attached to bottom walls of the channels. There are interlocking zipper features along a length of the apparatus. The interlocking zipper features are located inside channels of the hydraulic system. The channels have undulating channel walls. The hydraulic system includes a nozzle to cause the hydraulic fluid to apply the force. The hydraulic system includes a sealed recirculation system containing hydraulic fluid and configured to apply force to the hydraulic fluid in response to kinetic energy received from the wheel of the vehicle, to enable the hydraulic fluid to apply a corresponding force to cause motion of the energy converter, and to recirculate hydraulic fluid that has applied the force to cause the motion of the energy converter so that the sealed recirculation system can again apply force to the hydraulic fluid in response to kinetic energy received from the wheel of the vehicle or a wheel of another vehicle. The hydraulic system is pressurized. There are a series of interconnected rigid plates on the structure that receives kinetic energy.

There is a chamber to receive hydraulic fluid of the hydraulic system after it has transferred the received energy to the energy converter. The chamber includes a bladder accumulator. The bladder accumulator includes a bladder, a rigid enclosure for the bladder, and a compressible filler between the bladder and the rigid enclosure or inside the bladder. The compressible filler is configured to be matched to the vehicle or the pedestrian. The hydraulic system includes a path sealed at both ends and the energy converter is at a location along the path between the ends or at one of the ends of the path. The path is linear. The path is non-linear. One end of the path includes an accumulator. A portion of the path before the location of the energy converter extends along a direction traveled by the vehicle or the pedestrian and a portion of the path after the location of the energy converter extends in a direction opposite the traveled direction. And accumulator is located at one end or the other end or both ends of the path.

There are two or more modular units. The two or more modular units are mechanically coupled to one another. The two or more modular units are connected electrically to one another and together are connected by a single electrical connection to a load. The two or more modular units are not connected hydraulically to one another. The two or more modular units are electrically coupled directly or indirectly to one another. There is a unit that is modular with respect to one or more other modular units with which the apparatus can operate cooperatively. The apparatus includes an integrated sealed unit. The apparatus includes a portable unit.

The apparatus includes a mat. The mat includes a durable resilient material that can be compressed between 1 million and 100 million times before failing. The mat is rectangular. The mat includes an external surface exposed to the environment and internal chambers to house the energy converter and the hydraulic system. The apparatus has a length between 1 foot and 6 feet and a width between 1 foot and 15 feet, and a thickness between ¼ inch and 5 inches. The thickness of the apparatus is between ½ inch and 2½ inches. The mat includes an upper surface to receive the kinetic energy from the wheel of the vehicle or the foot of the pedestrian, and the upper surface has a contour that is other than flat. The mat is configured to lie on a travel surface along which a vehicle having a wheel or a pedestrian can travel. The mat is configured to be embedded within pavement bearing a travel surface along which a vehicle having a wheel or a pedestrian can travel. The structure to receive the kinetic energy and the energy converter are housed in separate housings and are connected by a channel of the hydraulic system. The structure to receive the kinetic energy is configured to be compressed by the wheel of the vehicle or the foot of the pedestrian and thereafter to rebound before a wheel of another vehicle or another foot of a pedestrian causes the structure to be compressed.

In general, in an aspect, a set of modular energy conversion units each has a structure to receive kinetic energy from a wheel of a vehicle or a foot of a pedestrian. An energy harvesting system includes a hydraulic system, to convert the kinetic energy to electricity to be delivered at an electrical interface. The electrical interfaces of the units are coupled to provide electricity to a load.

In general, in an aspect, there is a travel surface along which a vehicle having a wheel or a pedestrian can travel. The travel surface includes an energy receiving surface over which the wheel or a foot of the pedestrian passes as the vehicle or pedestrian travels along the travel surface. The energy receiving surface is part of an energy harvesting system that receives kinetic energy from the wheel and hydraulically transfers it to an energy converter for conversion to motion of the energy converter.

Implementations may include one or any combination of two or more of the following implementations. The travel surface is on pavement and the energy harvesting system is embedded in the pavement with the energy receiving surface exposed at the travel surface. The energy receiving surface is flush with the travel surface. The energy receiving surface is raised above the travel surface. The energy harvesting system includes a mat bearing the energy receiving surface and embedded in the pavement or disposed on the pavement, another part of the hydraulic system and the energy converter being separately embedded in the pavement or disposed on the pavement. The travel surface is on pavement and the energy harvesting system includes a portable unit temporarily positioned on the travel surface. The kinetic energy receiving structure is at a location at which the vehicle decelerates or stops. The kinetic energy receiving structure is at a location that is temporary.

In general, in an aspect, a rectangular energy harvesting unit is configured to lie on or be embedded within pavement that bears a travel surface for a pedestrian or a vehicle that has wheels. The energy harvesting unit has an upper surface that is exposed at the travel surface. The upper surface bears readable markings that are visible from the vehicle or to the pedestrian. The upper surface is sufficiently durable to withstand the passage over the upper surface of 1 million to 100 million vehicles or pedestrians. The upper surface has a predetermined frictional coefficient relative to the wheels or to feet of the pedestrian, and structural elements to protect the apparatus from damage by snowplows.

In general, in an aspect, an integrated portable energy conversion mat is to be installed at a pavement surface over which a vehicle, such as a car or truck, is to pass. The mat has a width at least as wide as the distance between the outermost edges of the treads of the tires located at an axle of the vehicle. The mat has a top surface over which the tires of the vehicle are to pass. The mat includes a sealed enclosed space housing and energy conversion system. The energy conversion system includes two sets of channels that extend along a length of the mat and contain hydraulic fluid under pressure. An energy converter converts energy carried by the hydraulic fluid in response to the tires of the vehicle passing over the top surface into electrical energy. An electrical port is coupled to the energy converter and exposed at an outer surface of the mat. The two sets of channels are spaced apart across the width of the mat by a distance that corresponds to the distance between the treads of the tires located at an axle of the vehicle. The energy converter is located within the sealed enclosed space of the mat and in the portion of the mat that is between the two sets of channels.

This and other aspects, features, and implementations, and combinations of them can be expressed as methods, apparatus, systems, components, program products, software, databases, methods and steps for performing functions, and in other ways.

Other aspects, features, implementations, and advantages are apparent from the following description and from the claims.

BRIEF DESCRIPTION OF DRAWINGS

FIG. 8 is a cross sectional view of a mat.
FIGS. 14 and 15 are diagrams of a housing.

DETAILED DESCRIPTION

We describe here an ultra-compact, hydraulic-based generator that is capable of harvesting energy from braking vehicles. Energy wasted by braking vehicles amounts to a tremendous potential source of savings worldwide. The generator system we describe here is fit for roadway environments and can withstand rigorous tests of durability, ease of deployment, structural integrity, and performance longevity, and can produce large amounts of power at relatively low expense.

Figure 1:
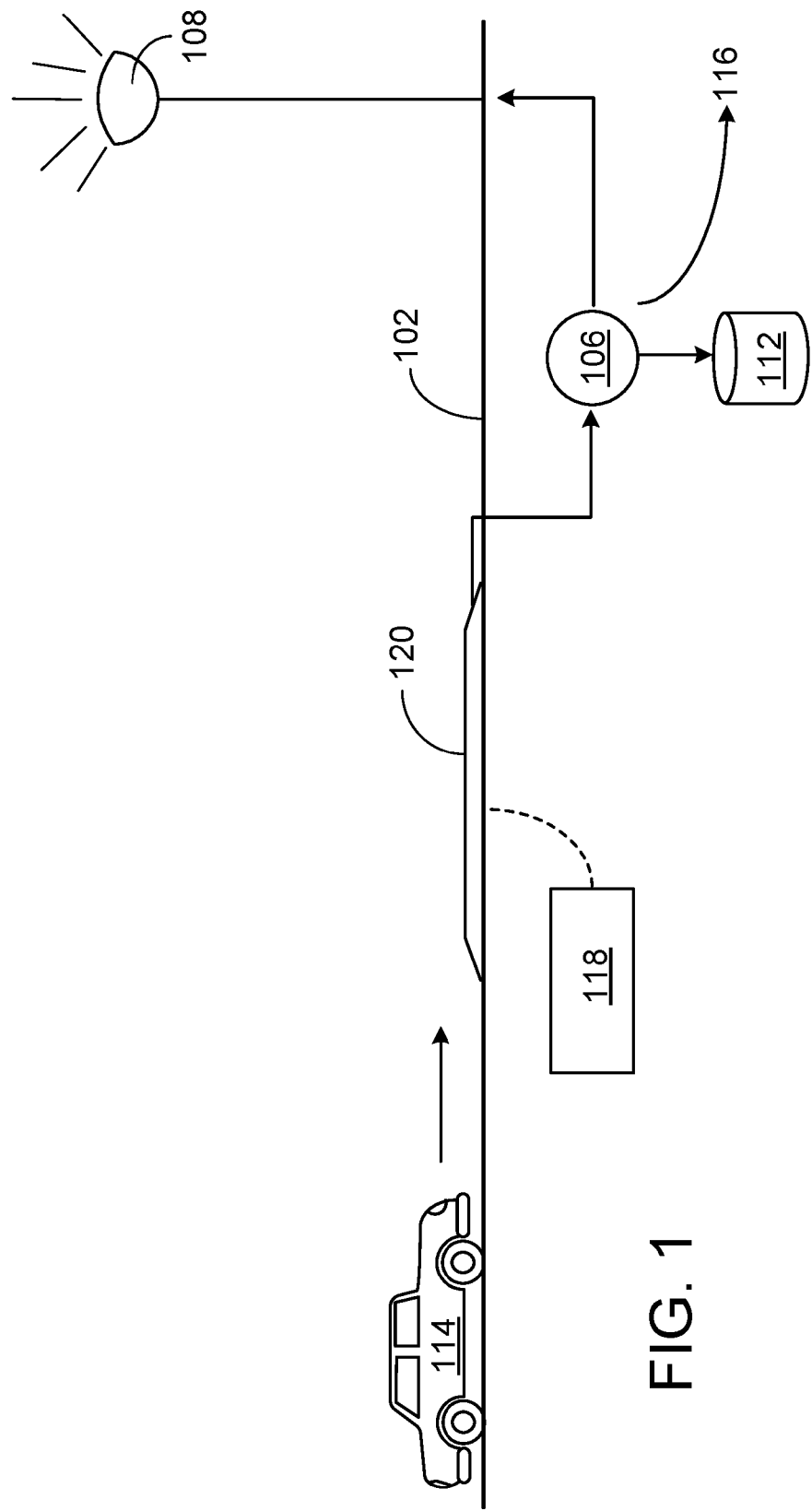
FIG. 1 is a diagram of an energy harvesting system.

Referring to FIG. 1, an energy harvesting system 100 is an ultra-compact, portable, and modular road-mounted generator system that is mounted on the surface of a road 102 or embedded into the road 102. The energy harvesting system 100 converts kinetic energy from vehicles 114 (e.g., cars, trucks, buses, bicycles, or other vehicles) passing over components of the energy harvesting system 100 into power, such as electricity. For simplicity, we refer in this description to energy harvesting from vehicles 114; however, energy can also be harvested from other actors, such as pedestrians, passing over the energy harvesting system 100.

The energy harvesting system 100 includes a road module formed of a mat 120 with built-in hydraulic channels (FIG. 2) having an incompressible fluid therein. When a vehicle 114 drives over the mat 120, the mat is compressed and the incompressible fluid is pushed the hydraulic channels in the direction of vehicle travel. The motion of the fluid through the hydraulic channels builds pressure in the system that causes a hydraulic generator (FIG. 2) to spin, thus generating electricity. The electricity can be output through integration endpoints 106 and used to power local electrical devices (such as LED lights 108, e.g., street lights), stored in local batteries 112, or transported to remote destinations 116 e.g., for storage or for entry into a power grid, or a combination of any two or more of them. The power generation capacity of the energy harvesting system 100 can depend on factors such the number of vehicles 114 that drive over the mat 120, the weight or speed of the vehicles 114 that drive over the road mat, or other factors, or a combination of any two or more of them.

In some examples, the energy harvesting system 100 can include dynamic controls 118 (which we sometimes refer to as an active control system). The dynamic controls 118 are capable of sensor data collection, inter-module communication, remote monitoring and access, or other functions, or a combination of any two or more of them. The dynamic controls 118 can enable the energy harvesting system 100 to respond in real-time to dynamic traffic and vehicle conditions in order to optimize performance. For instance, the dynamic controls can sense a heavier vehicle approaching and increase the operating pressures of the energy harvesting system 100 accordingly to harvest more energy from the heavier vehicle.

The energy harvesting system 100 can be installed at a wide range of sites where vehicles 114 slow down or stop, such as entry/exit gates at urban parking garages, distribution centers, toll plazas, or other locations, presenting a tremendous market opportunity. Furthermore, given its portable and easily deployable frame, the energy harvesting system 100 can also be installed for temporary use, for example at construction sites, large sports and entertainment venues, and remote military bases.

By an energy harvesting system, we mean a machine, device, mechanism, or apparatus, that absorbs ambient energy (for example, wind, solar, thermal or kinetic) or waste energy from other machines, devices, mechanisms, apparatuses, processes, or man-made movement (for example, kinetic, heat, or vibration), converts the absorbed energy into electricity, and stores or distributes the electricity, for example, for local use. A complete system can include multiple parts, materials, components, and connections, for example mechanical or electrical or both, to facilitate energy absorption, energy conversion, and the distribution of the resulting electricity. An energy harvesting system may have one direct conversion step, for example from vibration to electricity, or two or more conversion steps in sequence, for example from kinetic energy of a wave to compressed air in a cylinder to electricity.

By a mat, we mean a flat, compact, and typically flexible and non-elastic structure that includes one or more layers of a durable, resilient material (for example, rubber, canvas, Kevlar®, or a woven material, or another type of material) that can be compressed a large number of times (e.g., at least 1 million times, or between 1 million and 100 million times) by a maximum anticipated load or weight before showing signs of material wear or lack of structural or functional integrity. Mats may be constructed as solid, dense structures or with openings, cavities, pockets, channels, pads, cushions, springs, or other materials or devices embedded or enclosed within, and may be constructed in any shape (for example, rectangular or circular or another shape) and any dimensions (for example, at least 1 foot wide or between 1 foot and 15 feet wide, at least 1 foot long or between 1 foot and 6 feet long, and at least ¼ inch tall or between ¼ inch and 5 inches tall). Mats are intended to be stepped on, driven over, and generally to handle strain and withstand environmental elements and may soften, cushion, or absorb some of the force applied by a passing pedestrian or vehicle on the road, ground, or surface the mat is placed on. Mats can be waterproof.

By a hydraulic system, we mean a closed and sealed system, circuit, loop, or path that includes one or more conduits, channels, cavities, or other components that contain and move pressurized fluid, also referred to as hydraulic fluid. The pressurized fluid can move in continuous motion or in bursts. The pressurized fluid can move continuously in one direction, in the case of a closed loop system, or can move back and forth, in the case of a system with two sealed endpoints. Hydraulic systems can withstand and be optimized for a wide range of operating pressures, for example from low pressures like 5 pounds per square inch (psi) to high pressures like 3000 psi. Hydraulic systems can be made of a wide range of materials, for example various rubber polymers or metal alloys or other materials. Hydraulic systems can be connected (e.g., mechanically connected) to other components or systems or both to transfer energy from the form of dynamic fluid flow to other forms, for example torque or angular displacement (rotation). Hydraulic systems can range in size, for example from just a few inches to hundreds of feet. Hydraulic systems can include specialized materials, coatings, bearings, seals, connectors, or piping/tubing, or a combination of any two or more of them, to provide performance benefits, e.g., to effectively handle the hydraulic fluid moving within the hydraulic system over the lifetime of the system, which can be several years, for example 3-10 years.

By a hydraulic channel, we mean a designated pathway or conduit for fluid under pressure to sit idly or flow through when pushed in a particular direction by a force applied to the hydraulic channel.

By a nozzle, we mean an opening, outlet, or device at the end of a conduit in which a fluid under pressure is flowing and that is configured to allow the fluid to flow (for example, in a stream, spray, or jet) from the end of the conduit and to constrain, control, direct, release, shape, or form the flow of fluid. In some examples, the flow is directed at a device that will convert energy carried by the fluid flowing from the nozzle into another form, such as mechanical or electrical. A nozzle can be constructed of a wide range of durable materials (for example, metal, plastic, rubber) and in a variety of dimensions and specifications.

Referring to FIG. 2, each mat 120 of the energy harvesting system 100 (sometimes also referred to as an end-to-end system) acts as a structural housing or encasement that can house and enclose other components of the energy harvesting system 100. For instance, the mat 120 can house a hydraulic system, an energy conversion system, or an energy generation system, or a combination of any two or more of them. The hydraulic system can include one or more hydraulic channels 122 having incompressible fluid (sometimes also referred to as hydraulic fluid) therein.

Responsive to a vehicle 114 driving over the mat 120, the incompressible fluid flows through the hydraulic channels 122 and into a hydraulic accumulator 128. The hydraulic accumulator 128 delivers the incompressible fluid to the energy conversion system that converts the flow of incompressible fluid into mechanical forces. For instance, the energy conversion system can include one or more turbines 132 or other parts that convert the fluid flow into rotational speed. The mechanical forces (e.g., rotational speed) from the energy conversion system can be converted into electricity by the energy generation system, e.g., by one or more generators 222. The mat can also house components such as valves, connection points, sensors, gauges, electronic hardware, or other components that support the functioning of one or more of the hydraulic system, the energy conversion system, or the energy generation system, or that otherwise support the control or operation of the end-to-end system. The hydraulic channels 122 and the mat 120 itself are the only elements of the end-to-end system 100 that vehicles 114 interact with directly. The hydraulic channels 122 receive and transfer the force or kinetic energy from passing vehicles; that energy is the input to actuate the energy conversion and energy generation systems of the end-to-end system 100.

Figure 3:
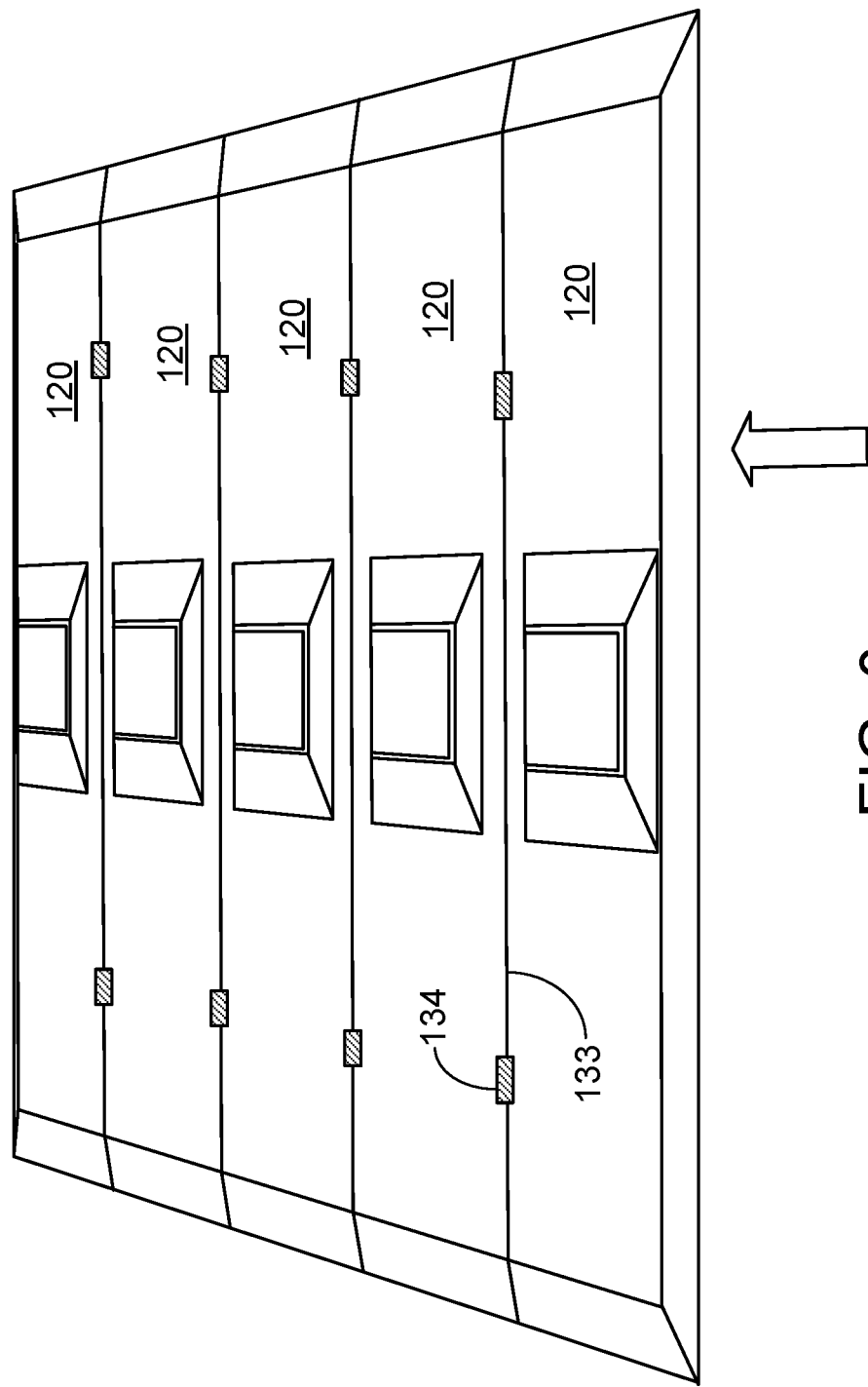
FIG. 3 is a diagram of an energy harvesting system with multiple mats.

Referring to FIG. 3, the energy harvesting system 100 can include multiple mats 120 (e.g., at least two mats, at least three mats, or at least five mats, e.g., between 3 and 10 mats, or another number of mats). The mats 120 can be aligned along the direction of vehicle travel and connected transverse to the direction of vehicle travel, e.g., along the long edges 133 of the mats 120. In some examples, multiple mats 120 can be mechanically connected via a connection mechanism 134 such as piano hinges, such that the energy harvesting system 100 includes an array of mats 120 that is capable of generating more electricity than a single mat. In some examples, multiple mats 120 can be installed with space in between each module, for example 10 feet in between one mat and the next, such that the energy harvesting system 100 includes multiple, separate mats 120. For instance, the multiple, separate mats 120 can be used to replace speed control mechanisms, such as speed bumps or rumble strips. The individual mats 120 in the energy harvesting system 100 are not hydraulically connected to one another, meaning that hydraulic fluid will be contained within each mat 120 and will not pass from one mat 120 to another.

Mats 120 can be manufactured with prefabricated, preassembled, or molded connection mechanisms 134, such as connection points, hinges, or other connection mechanisms along one or both of their long edges 133. For example, the adjoined edges 133 of two adjacent mats 120 can be fitted with the two sides of a piano hinge, separating hinge, butt hinge, or other hardware to secure the mats to one another. In some examples, the connection mechanisms 134 can be hardware that is separate from the mat 120, for example parts manufactured with steel that are embedded in the mat material. In some examples, the connection mechanisms 134 can be molded or fabricated as an integral part of the mat 120, e.g., using the same material as the mat, for example rubber.

In general, the mat 120 of the energy harvesting system 100 is connected to the outside world through an electrical connection (e.g., through the integration endpoints shown in FIG. 1). For instance, the mat 120 can be connected to external equipment, parts, or systems through electrical wires, parts, components, or materials. When the energy harvesting system 100 includes an array of mechanically connected mats, the electrical connections, wires, and outputs from each of the mats 120 in the energy harvesting system 100 can be joined or aggregated so that only a single wire or set or wires is connected to the external equipment, parts, or systems receiving the electricity generated by the mats 120.

The combination of parts, components, subsystems, and the end-to-end system 100 as a whole, aims to maximize the kinetic energy harnessed from vehicles and the efficiency with which the harnessed kinetic energy is converted into electricity. For instance, the end-to-end system 100 can be designed so that the force applied to the end-to-end system 100 by the weight and speed of each passing vehicle 114 pushes a large amount of hydraulic fluid through the hydraulic channels 122 and creates a large pressure differential between regions of the hydraulic system before the energy conversion system and regions after the energy conversion system. A drop in hydraulic fluid pressure represents a release of energy; thus in the case of the end-to-end system 100 described here, a pressure differential before and after the energy generation system indicates conversion of kinetic energy to rotational energy by the energy conversion system (which rotational energy is subsequently converted to electricity by the energy generation system). The end-to-end system 100 can be designed so that some or all parts, components, materials, or mechanisms that are separate from the energy generation system create little friction, resistance, backpressure, or other effects that may constrict the flow of hydraulic fluid through the end-to-end system 100 in order to enable a large amount of the potential energy carried in the pressurized fluid to drive, actuate, power, or otherwise be input into the energy generation system. Reducing or minimizing the inertia that can actuate the energy harvesting system 100 from a rest state, e.g., by designing smaller parts or choosing lighter materials, can also help achieve the goal of increasing or maximizing the energy produced by the energy harvesting system.

Mat

Referring again to FIG. 2, the mat 120, which serves as the structural housing for most components of the energy harvesting system 100, includes exterior walls and an interior structural skeleton. The exterior walls of the mat 120 are exposed to elements that are external to the energy harvesting system 100. For example, a top surface 136 of the mat 120 comes in contact with the tires of vehicles 114 passing over the mat 120. A bottom surface 138 of the mat 120 comes into contact with the road pavement (for a mat 120 that is mounted on the surface of the road 102) or with an interior layer of the road (for a mat 120 that is embedded into the road 102). The interior of the mat 120 serves as a skeleton that houses and structurally supports components of the energy harvesting system 100, such as the hydraulic system, the energy conversion system, and the energy generation system (and all of their components, parts, and subsystems). The components of the energy harvesting system can be housed within hollow spaces, pockets, channels, or other areas within the interior of the mat, which areas can be separated by dividers, separators, walls, or other structural elements. In some examples, the mat 120 can house only the hydraulic system, with the energy conversion and energy generation systems secured in a separate housing or box, e.g., off to the side of the road 102 and connected to the mat 120 with mechanical connections, hydraulic connections, or both.

Figure 2A:
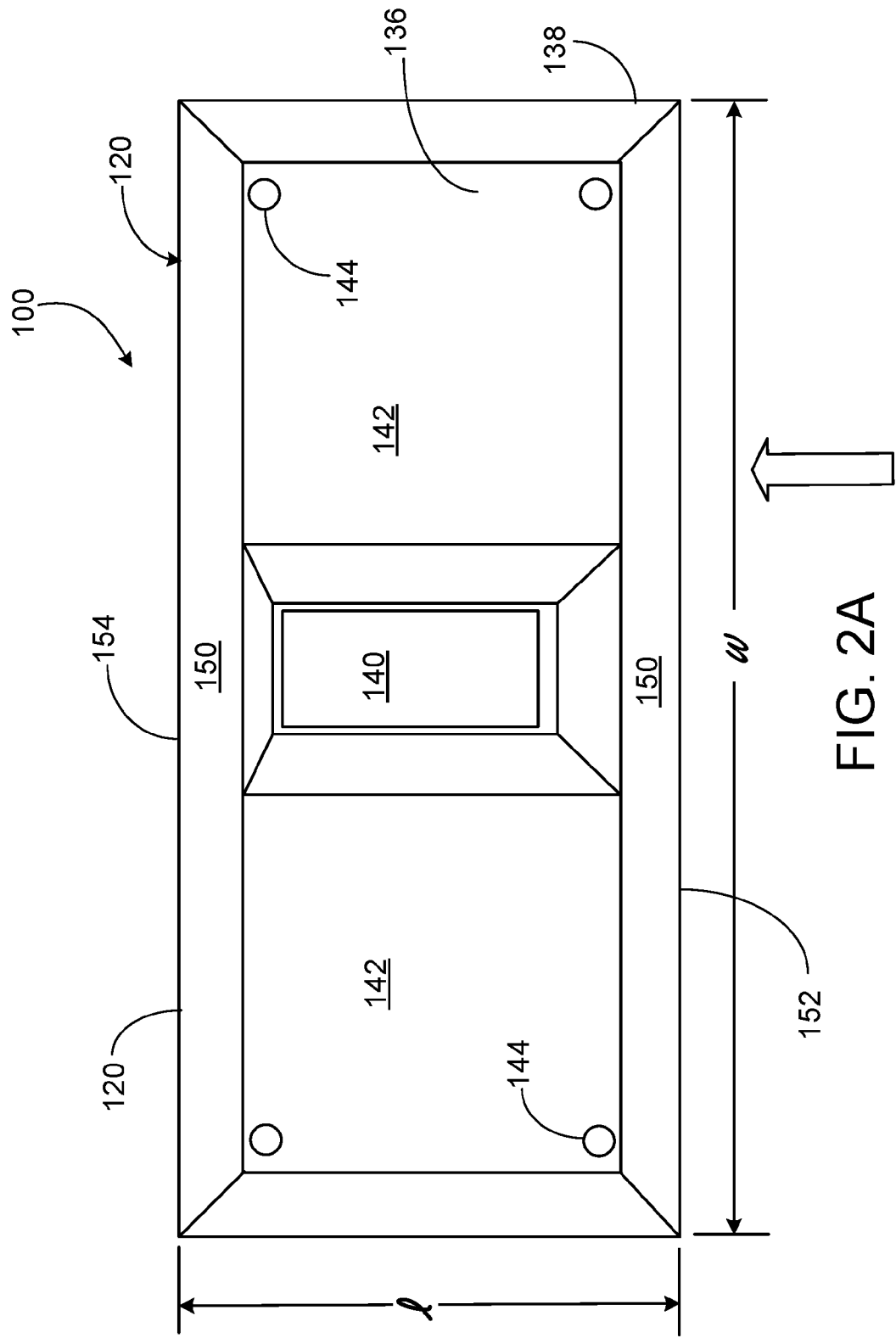
FIGS. 2A and 2B are diagrams of a mat of an energy harvesting system.
Figure 2B:
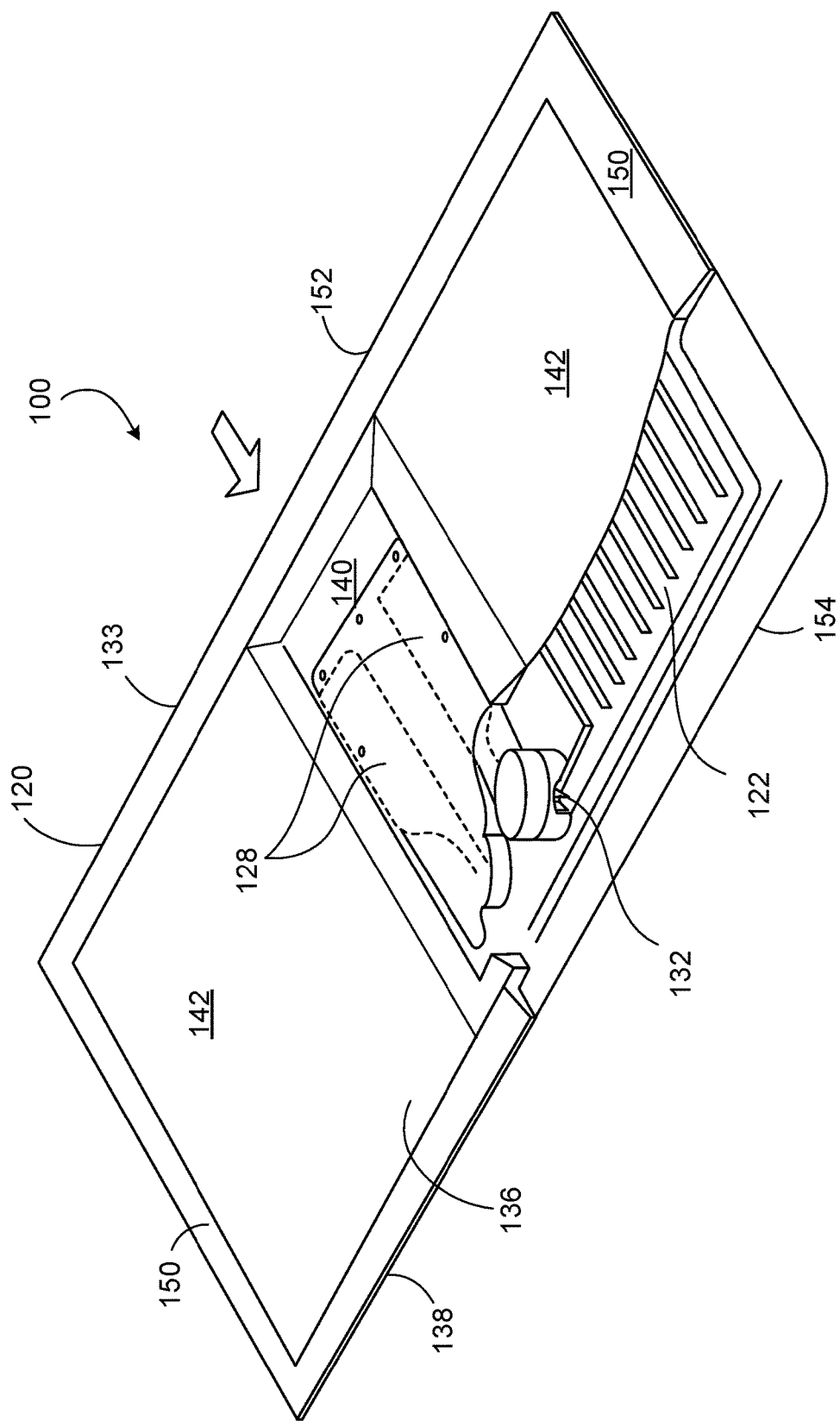
Figure 4:
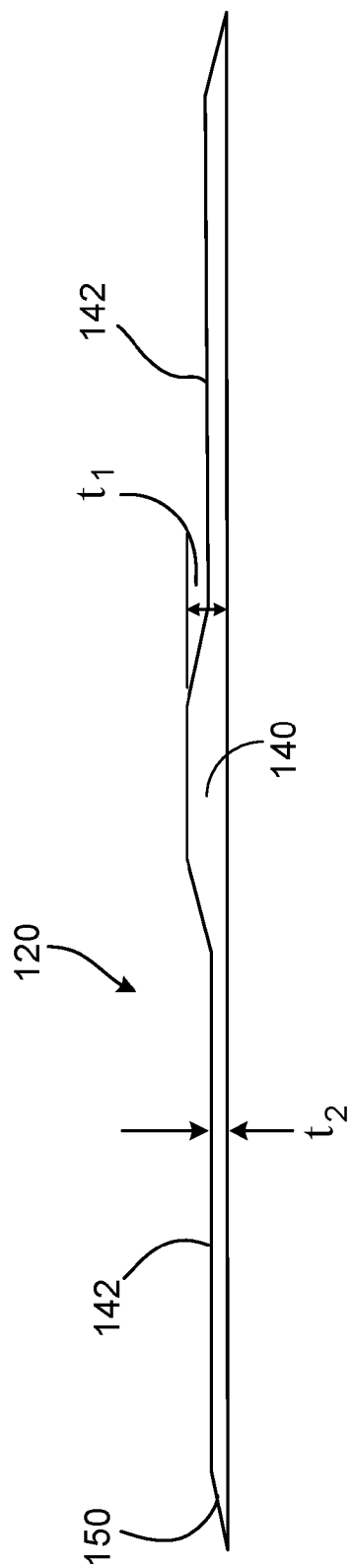
FIG. 4 is a side view of a mat.

Referring to FIGS. 2A and 4, in some examples, the mat 120 can have a width w that is substantially equal to the width of a typical traffic lane on a highway or street (for example, a width of between about 8 feet and about 15 feet). The mat 120 can have a length l of, for example, between about 3 feet and about 10 feet, e.g., about 4 feet.

The mat 120 can be flat and compact, with a low height profile, to be easily installed on top of road surfaces and to allow easy and comfortable passage of vehicles over the mat 120 while still permitting the components of the energy harvesting system 100 to be housed within the mat 120. For instance, the thickness of the mat can be between about ½ inch and about 2½ inches. By thickness, we mean either (1) the distance between the bottom surface 138 and the top surface 136 of the mat or (2) the height of the top surface 136 of the mat above the surface of the road 102. In some examples (e.g., as shown in FIG. 4), a central section 140 of the mat can have a thickness t1 greater than a thickness t2 of peripheral sections 142 of the mat 120. This configuration can to provide sufficient space to house the energy conversion and energy generation systems in the central section 140 and to allow vehicle tires to comfortably pass over the peripheral sections 142. For example, the central section can be about 4 inches thick while the peripheral sections can be about 1-2 inches thick. This configuration allows the energy conversion and energy generation systems to be housed in the central section of the mat while leaving sufficient clearance for vehicles' underbody to pass over the central section of the mat without contacting the mat and allowing vehicles to comfortable drive over the mat. The highest point on the mat (e.g., the thickest portion of the mat) can be lower than the lowest clearance height of the underbody of a vehicle 114 expected to drive over the mat 120. For example, if the lowest bottom clearance of a vehicle 114 expected to drive over the mat 120 is 5 inches, the highest point of the mat can be less than 5 inches in order to avoid a collision between the underbody of the vehicle 114 and the top surface 136 of the mat. In some examples, e.g., when the mat 120 houses only the hydraulic system, the entire mat 120 can have a constant thickness, for example about 1-2 inches thick.

In some examples, the mat can be mounted on top of the road such that road excavation or major construction is not necessary. The mat can be secured to the road surface in a variety of ways. For example, referring again to FIG. 2A, the mat 120 can have built-in, reinforced mounting holes 144, for example with diameter between about 1/16th of an inch to about 1 inch. The mounting holes can be disposed around the perimeter of the mat or at one or more of the four corners of a rectangular mat (as shown in FIG. 1). The mat can secured to the road surface using attachment mechanisms such as concrete bolts, asphalt spikes, pins, or other attachment mechanisms that can be drilled, screwed, hammered, shot, or otherwise secured through the mounting holes 144 and into the road surface (e.g., a road surface of pavement, asphalt, concrete, or another material). Heavy-duty liquid, spray, or gel adhesives that are used with various construction materials, such as wet, frozen, or treated wood, metal, plastic, brick, concrete, or ceramic, such as Titebond™, Liquid Nails™, or 3M™ liquid sprays, or other types of adhesives, can be applied to the bottom surface 138 of the mat, the top surface of the road, or both to secure the mat 120 in place. In instances where multiple mats 120 are mechanically connected (e.g., in series), the same approach can be used to secure each of the mats 120 in the array to the road surface. Arrays of multiple mats 120 can have more stability than individual mats 120, e.g., because of greater contact area with the road relative to vehicle tire contact and a greater overall traction between the mats 120 and the road 102.

Figure 5:
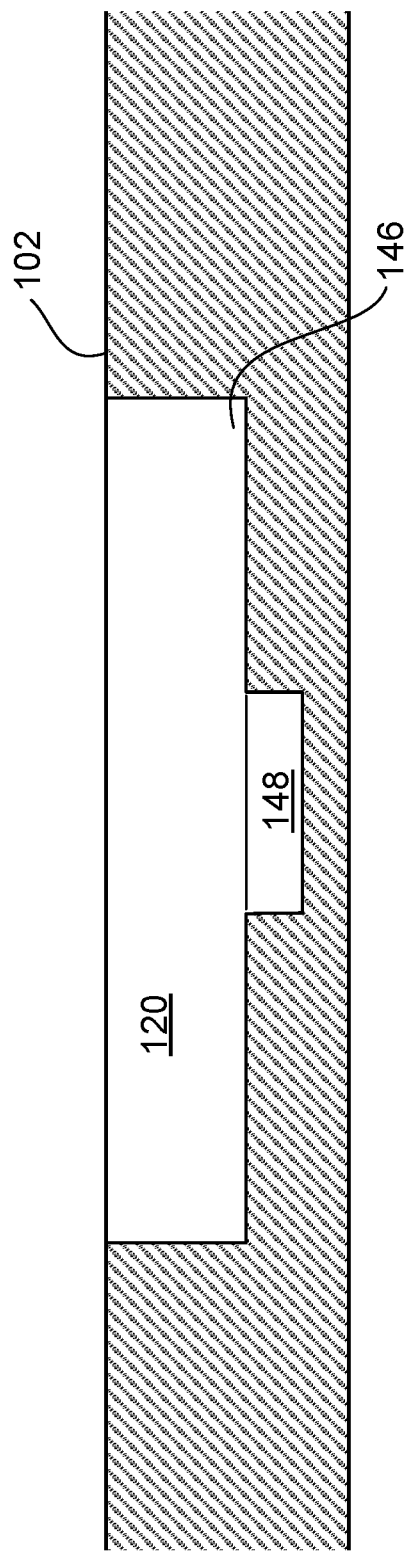
FIG. 5 is a side view of a mat embedded in a road.

Referring to FIG. 5, in some examples, the road 102 surface can be thinned (e.g., machined or milled down) to form a well 146 receive the mat 120. For instance, the well 146 can have a depth that is substantially equal to the thickness of the mat 120 so that the mat 120 is flush with the road 102 surface (as shown in FIG. 5), or the well 146 can have a depth that is less than the thickness of the mat 120 so that the mat 120 is set into the road 102 and only protrudes above the road 102 surface by a small amount (e.g., about 1 inch). This installation allows the travel surface for vehicles to be substantially flat and continuous. In these examples, the mat can be thicker, for example about 1½ inches to about 4 inches thick. In some examples, the road surface can be further thinned (e.g., machined or milled down) to form a well 148, e.g., below (as shown in FIG. 5), adjacent to, or near the well 146. The smaller well 148 can be sized and dimensioned to house for the energy conversion systems, energy generation systems, or both such that the energy conversion systems, energy generation systems, or both can be embedded in the well 148 rather than being housed in the mat 120 itself. The well 148 for the energy conversion system or energy generation system can be smaller than the well 146 for the entire mat 120. The wells 146, 148 can be fabricated as part of new road construction or as a retrofit to existing roads.

The mat 120 can be made of different materials, such as rubber, polymers, or thin films. Rubber mats can be formed by rubber manufacturing processes such as injection molding, cast molding, die cutting, laser cutting, extrusion, sewing, radio frequency (RF) welding, or other rubber manufacturing processes, or a combination of any two or more of them. Mats formed of thin films can be formed by roll to roll fabrication or other thin film manufacturing processes. Channels, cavities, or other spaces in the interior of the mat 120 can be formed within the rubber or thin film as the mat 120 is fabricated.

The material that we refer to when we use the phrase "rubber" can be, e.g., fluorosilicone rubber, ethylene acrylic rubber, styrene-butadiene rubber, nitrile rubber, or another rubber material. The rubber materials used for the mat 120 can be rated highly on performance parameters such as compression, resistance resilience (rebound), tear strength, heat aging resistance, water swell resistance, gas impermeability, abrasion resistance, or other performance parameters, or a combination of any two or more of them. Other materials besides rubber can be used, such as woven polyester, natural or synthetic fibers, or other materials. Manufacturing processes can include advanced or specialized methods to reduce material and waste, for example inserting hollow tubing where otherwise solid rubber would be used to maintain structural integrity of the mat 120 while reducing the quantity of material used to manufacture the mat 120. Manufacturing processes can enable material densities to be varied throughout the mat, for example using denser polymers, rubbers, or materials in certain regions of the mat to provide durability, material strength, or other properties, and strategically inserting micro-air pockets or using particular material textures, weaves, or patterns that are less dense in other regions of the mat to allow for greater flexibility, resilience, or other properties. The use of dual compounds (or multi-compounding), a rubber manufacturing technique used to vary density of rubber for different functionality, for example with vehicle tires, can enable the customization and optimization of the performance of the mats 120.

The mat can be strong enough and have an outer surface that is durable enough to handle the strain and force caused by the maximum vehicle weight anticipated at a given installation or use case, for example, a fully loaded 80,000 lbs. long-haul truck. The mat can be resilient enough to receive and withstand a very large number of activations (for example 1 million or 10 million or 100 million compressions over the course of several years) by vehicles passing over it. Furthermore, the mechanical and hydraulic elements of the energy harvesting system can be designed to rebound properly after each compression, for example, returning to rest position quickly enough after activation by a first vehicle or axle to be able to absorb the compression by the next vehicle or axle. The mat can be durable enough to withstand harsh weather and road conditions (for example, extreme hot or cold temperatures, sleet, snow, ice, salt, or rain, or other conditions, or a combination of any two or more of them) for periods of use ranging from several months to several years at a time. The top surface of the mat can be fabricated or treated (e.g., coated) to meet any relevant road material standards or requirements, for example, matching friction coefficients for safe passing on roads. Typical friction coefficients for roads range from 0.7 for dry roads to 0.4 for wet roads.

Referring again to FIG. 2A, in some examples (e.g., if the mat 120 is mounted on top of the road surface), the mat 120 can have beveled edges 150 on one or more sides of the outer perimeter. For example, a rectangular mat can have four beveled edges 150. Each beveled edge 150 can slope down from the top surface 136 of the mat 120 to the road 102 surface to enable smoother ascent onto and descent from the top surface 136 of the mat 120 for vehicles 114 approaching the energy harvesting system from any angles. The beveled edges 150 can be made of hard, durable rubber, e.g., similar to parts of the mat 120 itself, such as the rubber polymers and materials described above. The length of the beveled edges 150 can vary depending on factors such as the starting height of the mat 120, and can generally accommodate comfortable travel by vehicles 114 up or down the slope of the bevel 150. For instance, each bevel 150 can have a horizontal length of between about 3 inches and about 12 inches. In some examples, the bevels 150 can be an integral part of the mat 120, e.g., formed during mat fabrication. For instance, the bevels 150 can be formed of solid rubber during fabrication of a rubber mat. In some examples, the bevels 150 can be a separate piece or multiple pieces (e.g., rubber pieces) that are secured to the perimeter of the mat 120 and connected to one another at each corner. For instance, a single rubber piece formed into a rectangular ring with an internal opening measuring the dimensions of the mat 120 (e.g., 4 feet wide by 10 feet long) with bevels sloping outward can fit snugly around a mat 120 of dimensions 4 feet wide by 10 feet long and create smooth ramps around the perimeter of the mat 120.

In some examples, the mat 120 can be treated (e.g., coated or otherwise treated) to enhance traction, friction coefficients, or other roadway safety metrics or other performance parameters, or a combination of any two or more of them. In some examples, the materials or manufacturing processes or both can enable or include printing on one or more surfaces of the mat 120, such as the top surface 136 of the mat 120. Printed images or text can cover all or part of the exposed surfaces of the mat 120, and can incorporate any number of colors, pigments, and materials. For instance, printing on the exposed top surface 136 of the mat can be used to replicate, extend, clarify or highlight roadway lines, traffic indicators, or other signage, or to display public service announcements or public messages, branding for a host facility, or sponsorship of associated or supporting organizations, or other information. Printing capabilities can include conventional printing equipment and processes, or varied and advanced materials, or both. For example, embedding reflective materials or tape can enhance visibility of the energy harvesting system to drivers, while also making the printed text and images stand out further. In some examples, the materials used for printing on the surface of the mat 120 can maintain the properties of the mat material, such as friction coefficients or other safety features of the energy harvesting system. For instance, printing materials can be selected based on knowledge of paints or other materials used on road surfaces and the performance of those paints or materials in various weather conditions.

Material selection can determine or impact mat performance, such as ruggedness or ability to withstand harsh weather environments or varying conditions, such as temperature and precipitation. Additional components or mechanisms can be used in the mat to reduce or prevent damage to the mat from external factors, such as snowplows or emergency vehicles. In some examples, thin, long, curved and raised metal railings or strips could be installed on one or more sides of the mat (e.g., left and right sides) to prevent snowplows from causing damage to or uprooting the mat. The metal railings can be aligned in the direction of traffic flow and spaced apart enough so that vehicle tires would fit within the railings but the plow of a snowplow would extend beyond both sides. The metal railings can start in front of the mat at road height, curve up and over the mat, and curve back down to touch the road surface on the other side of the mat. The metal railings can be made of strong, durable metal, for example steel, to withstand the impact of snowplows or other equipment. As snowplows approach and drive over the mat, the plow itself would be guided up and over the railings while the vehicle's tires would drive over the mat itself.

Hydraulic System

Referring again to FIG. 2B, the internal architecture of the mat houses and accommodates the hydraulic system. Hydraulic channels 122, chambers, cavities, ports, connections, bladders, or other components of the hydraulic system, or a combination of any two or more of them, can be housed between the top surface 136 and the bottom surface 138 of the mat 120. The peripheral sections 142 of the mat, where vehicle tires come into contact with the mat 120, house multiple hydraulic channels 122 (e.g., each about 1 inch wide), aligned in the direction of traffic flow. Generally, as a vehicle 114 passes over the mat 120, the hydraulic fluid 122 that is contained within the hydraulic system will move, in sequence, from the hydraulic channels 122, through the energy conversion system (e.g., the turbine 132), into the hydraulic accumulators 128, and then back to the hydraulic channels 122, either through the energy conversion system again or by means of a conduit to bypass the energy conversion system and return directly to the hydraulic channels.

Figure 6:
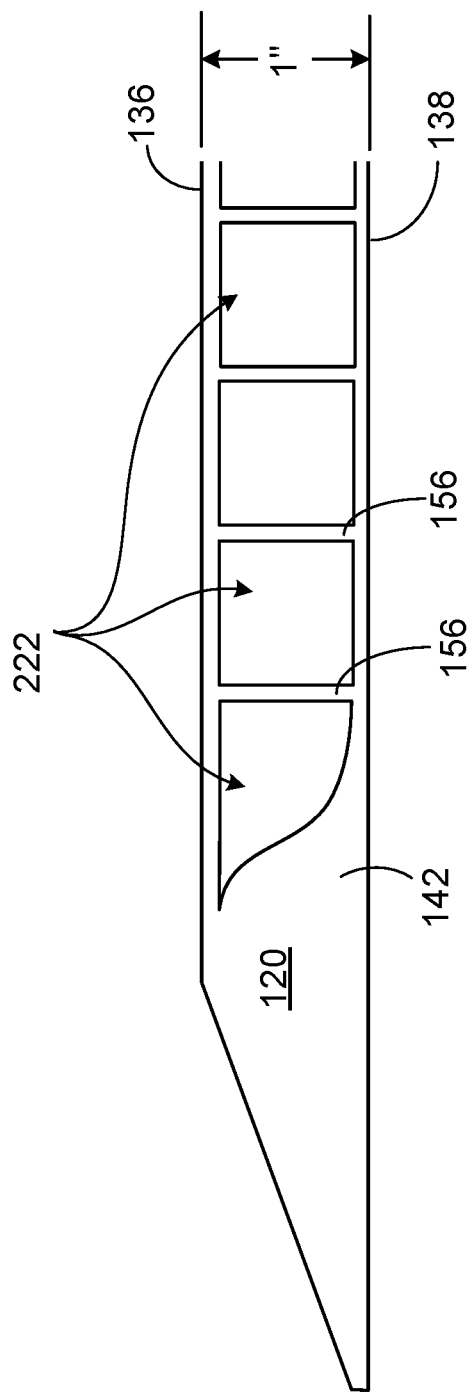
FIG. 6 is a cross sectional view of a mat.
Figure 7:
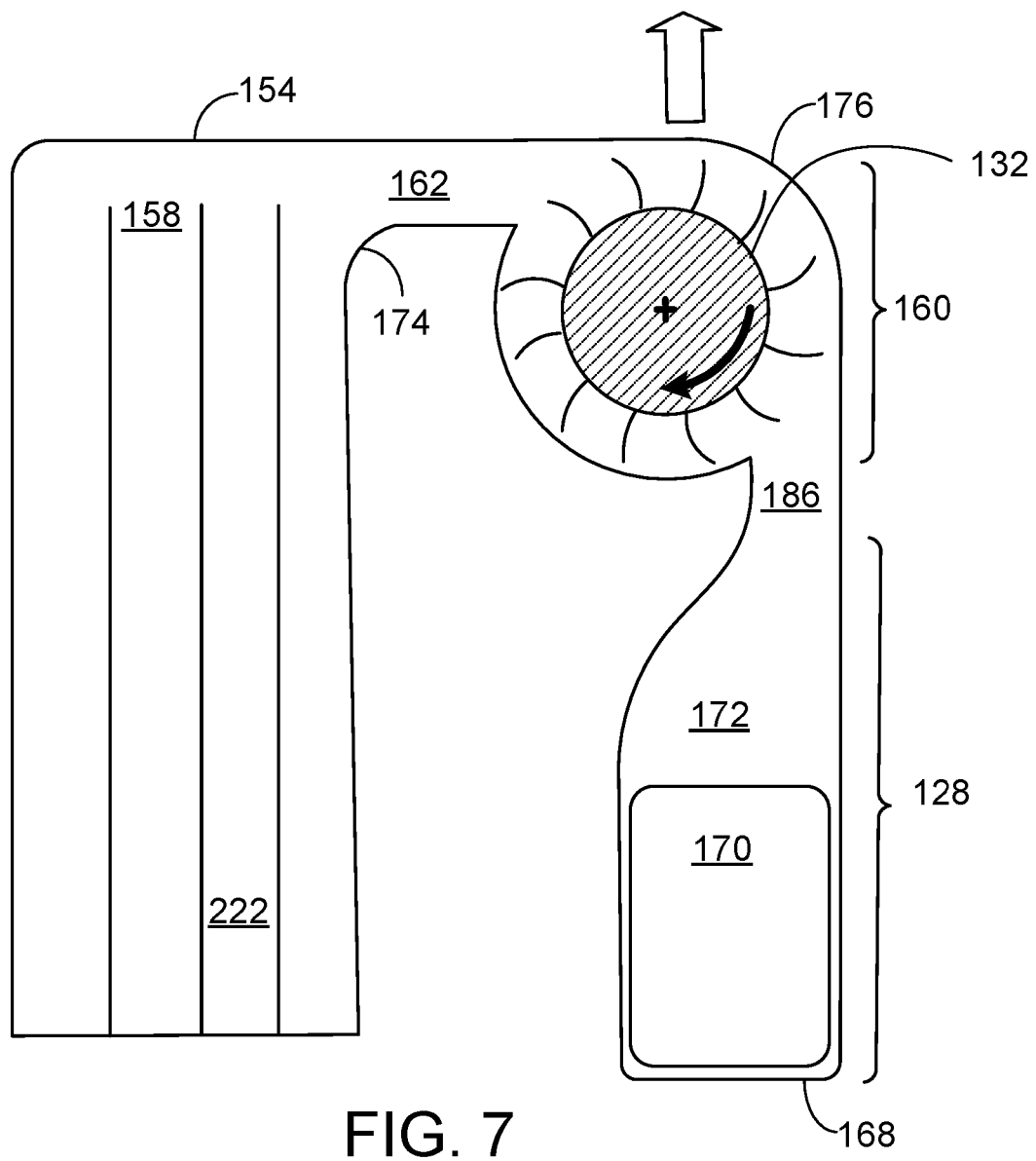
FIG. 7 is a view of the interior of a mat.

More specifically, referring to FIGS. 6 and 7, the hydraulic fluid moves back and forth repeatedly between two sealed endpoints. The first endpoint is long, sealed hydraulic channels 122 embedded within the peripheral sections 142 of the mat and oriented along the length of the mat 120 in the direction of vehicular travel. In the example of FIG. 6, the hydraulic channels 122 have a substantially square cross-section; however, the channels can also have other shapes. The second endpoint is the hydraulic accumulator 128 embedded within the central section 140 of the mat. Rather than circulating continuously in one direction in a closed loop system, the hydraulic fluid can be pushed from the first endpoint (the hydraulic channels 122) toward the second endpoint (the accumulator) by the weight and force applied by a vehicle traveling over the mat 120. The hydraulic fluid can then rebound back to its rest position in the hydraulic channels 122 by the rebalancing of pressure differentials across the two endpoints. For example, when a vehicle 114 first drives onto a front edge 152 of the mat 120, and the weight of the vehicle 114 depresses the top surface 136 of the mat and pinches the hydraulic channels 122 near the front edge 152 of the mat 120. The pinching of the channels causes the fluid to be pushed along the channel from the front endpoint toward the rear endpoint. In some examples, multiple hydraulic channels can be lined up next to each other, such that the when vehicle 144 depresses an area equal to the width of its tires, multiple channels within that area are pinched, where the exact number of channels depressed depends on the width of each channel and the size of the tire.

Without discrete channels, for example with only a single large cavity contained within the mat to hold the hydraulic fluid, it would be challenging to control the direction the fluid flowed as a vehicle drove over the mat 120. For example, as vehicles drive onto a mat having a single large cavity to contain the hydraulic fluid, depress the top surface of the mat, and move forward, the hydraulic fluid would likely be pushed in a radial spray in all directions around the tire, given that the hydraulic fluid will move in the path of least resistance. Instead, if the hydraulic fluid is contained within one or more channels narrower than the width of the tire, the channels will be substantially fully compressed as a tire passes over the channels, causing the hydraulic fluid contained therein to move forward through the channels. In some examples, the mat includes enough channels within a designated area so that the width of a tire can fully compress all channels below the tire no matter where on the mat the tire passed. For instance, the channels can be narrow enough so that in very few or no instances could a tire pass over some part of the mat and only partially compress a channel and, therefore, not push the hydraulic fluid forward in that channel. This may mean as many as hundreds of channels in a 4-foot wide area. In some examples, the hydraulic channels 122 are at least about ½ inch in width in order to balance the desire to allow a tire to fully compress all pinched channels and the desire to avoid using excess quantities of materials.

As the vehicle tire moves forward, the tire pinches the hydraulic channels 122 at locations further from the front edge 152 of the mat 120 and nearer to a rear edge 154 of the mat. This progressive pinching of the hydraulic channels 122 causes the hydraulic fluid contained within the hydraulic channels 122 to be pushed forward until the fluid reaches an endpoint (for example, a valve, seal, or enclosed chamber, e.g., toward the rear edge 154 of the mat 120) or there is no force left to push the fluid further (for example, the vehicle 114 has driven past the mat 120). The hydraulic system can be completely sealed and built to withstand the maximum pressure expected to be created within the hydraulic channels 122 (for example, up to 100 or 200 psi (pounds per square inch)) in order to minimize or prevent leaks of the hydraulic fluid. At rest, the hydraulic fluid can be pressurized to between about 2 psi to about 200 psi, e.g., approximately 5 psi.

The hydraulic channels 122 can be located in the peripheral sections 142 of the mat 120, where vehicle tires will pass. In a specific example, referring again to FIG. 1A, a mat 120 measures 10 feet wide (roughly the width of a traffic lane), 4 feet long (in the direction of vehicle travel), and 1.5 inches tall on the peripheral sections 142 of the mat 120 (where the hydraulic channels 122 are contained). The central section 140 of the mat 120 (where the energy conversion system, the energy generation system, and the hydraulic accumulator 128 are located) is roughly 2 feet wide. The volume of fluid contained in each of the peripheral sections 142 of the example mat can be measured, for example, as roughly 4 feet wide, by 4 feet long, by 1 inch tall (assuming the top and bottom layers of the mat are each ¼ inch tall). All of these dimensions may vary depending on the particular application. That volume can, for example, be divided into 32 channels each measuring roughly 1.5 inches wide, 4 feet long, and 1 inch tall. The width of each channel can vary and will, in turn, vary the number of channels that fit in a given volume.

Referring again to FIG. 6, the ceiling and floor of the hydraulic channels 122 are the top and bottom surfaces 136, 138 of the mat 120, and are made of whatever material is used to manufacture the mat 120. A dividing wall 156 separates each hydraulic channel 122 from an adjacent hydraulic channel. The dividing walls 156 begin at the front edge 152 of the mat 120 and extend almost all the way to the rear edge 154 of the mat 120. At the rear edge 154, hydraulic fluid can flow from side to side in a space 158 that allows the hydraulic fluid to redistribute among the hydraulic channels, thus balancing the pressure across the channels. In some examples, compressible hoses, tubes, or pipes can be used in place of the channels.

The dividing walls 156 separating can have several characteristics that can contribute to the efficient use and functioning of the hydraulic system. The dividing walls 156 can be thin, flexible or compressible, and capable of containing and withstanding the operating pressures of the hydraulic fluid. The dividing walls 156 can be thin so that the volume of fluid pushed by each vehicle is maximized. If the dividing walls 156 were too thick, then the hydraulic channels 122 would be further apart from one another, and each vehicle 114 passing over the mat 120 would, for example, compress and push fluid in fewer hydraulic channels than would be the case were the hydraulic channels closer together. The dividing walls 156 can be between about 1/32 inch and about ¼ inch in thickness. The flexibility or compressibility of the dividing walls 156 allows the top and bottom surfaces 136, 138 of the mat 120 to be pinched together, thus enabling vehicles 114 to push hydraulic fluid through the hydraulic channels 120. The dividing walls 156 can be connected to the top and bottom surfaces 136, 138 of the mat 120 by various mechanisms or manufacturing processes. For instance, if the dividing walls 156 are made of materials similar to the mat 120, the dividing walls 156 can be molded, cut, or melded during the mat fabrication process. In some examples, the dividing walls 156 can be adhered or secured to the mat 120 using industrial adhesives or other materials.

Various designs or structures for the dividing walls 156 can be implemented to make the dividing walls compressible. In some examples, the dividing walls 156 can be made of thin flexible membranes that can be bent or folded in any direction and that have the resilience to endure millions of such compressions, but that are minimally elastic in order to not to stretch under the sudden pressure spikes from fluid movement caused by vehicle passes. The membranes can be made out of rubber latex or other synthetic materials, or could be made of organic materials with similar characteristics. In some examples, the membranes can effectively be mimicking physical characteristics of some seaweed blades, in that the membranes can be non-elastic, flexible, and thin. To ensure consistent repetition of compression of the channel and folding of the dividing walls, the dividing walls can be manufactured with a curvature, seam, perforation, texture, or other mechanism that makes each dividing wall predisposed to fold in a particular direction and fashion. For example, the dividing walls of adjacent hydraulic channels 122 can be manufactured to be slightly concave and pointing in the same direction, so that as vehicles drive over the mat, the walls all bend in the same direction and collapse uniformly and consistently. In some examples, the dividing walls can use an accordion design. With a zig-zag pattern running from the dividing wall's connection with the top surface 136 of the mat 120 to the connection with the bottom surface 138 of the mat 120, like accordion springs or pleated window shades, the dividing walls can be compressed uniformly and can handle millions of compressions. The number of bends in the accordion wall can vary, e.g., from 1 to 20 bends per inch height of the dividing wall. The width of each bend or flap can vary, e.g., from about 1/32 of an inch to about 1 inch. The accordion wall can be made of different materials, such as plastic, rubber, or metal.

The dividing walls 156 do not need to be rigid to hold up the top surface 136 of the mat 120. When pressurized, the hydraulic fluid itself can hold up the top surface 136 of the mat 120 and, therefore, will stress the dividing walls 156 and the connections between the dividing walls 156 and the top and bottom surfaces 136, 138 of the mat 120 by stretching or pulling the dividing walls 156. A material's tensile strength is the maximum stress it can withstand before failing or breaking. The dividing walls 156 can have a tensile strength between about 16 MPa and about 100 MPa in order to sustain the maximum spike in pressure (e.g., up to 100-200 psi) expected to be applied by the force of passing vehicles. Tensile strength is different from and not directly related to compressive strength. The materials that are likely to be used for the dividing walls, such as plastics, rubbers, and adhesives, typically have higher tensile strengths than compressive strengths; therefore, materials selected will generally have compressive strength high enough to withstand the maximum load expected on the mat 120 and hydraulic channels 122.

As mentioned above, in some examples, the dividing walls 156 can be attached or connected to the mat 120 on three sides (top surface 136, bottom surface 138, and front edge 152), but not connected to the mat 120 on the back edge 154. A space 158 between the rear end of the dividing wall 156 and the rear edge 154 of the mat 120 (e.g., a gap of between about 1 inch and about 12 inches, e.g., about 3 inches) allows hydraulic fluid 122 to flow from side to side and rebalance pressure across all channels. Hydraulic fluid pushed out of multiple hydraulic channels 122 can merge in the space 158 towards the rear edge 154 of the mat 120 and flow together to the point of least resistance (e.g., the point of lowest pressure). The presence of the space 158 allows hydraulic fluid from multiple channels to pass through a single port 162 into the energy conversion system 160, rather than having a separate port for each one of the many hydraulic channels. For example, if the operating pressure of the hydraulic fluid in the hydraulic channels 122 at rest is 5 psi, and the pressure spikes to 30 psi in the hydraulic channels 122 when a vehicle drives over them, then the hydraulic fluid contained within the compressed hydraulic channels 122 will be pushed forward. Upon reaching the space 158 at the rear edge 154 of the mat 120, the hydraulic fluid can either enter one or more of the adjacent uncompressed hydraulic channels resting at 5 psi or can flow into the energy conversion system 160 that at rest holds no pressure or 0 psi. The hydraulic fluid will naturally follow the path of least resistance or lowest pressure and, therefore, will move into the energy conversion system 160 and not into the adjacent, low pressure hydraulic channels 122.

In order to facilitate or accelerate the movement of hydraulic fluid from the hydraulic channels 122 into the energy conversion system 130, the channels can be constructed in various shapes and with varied dimensions to change the operating pressure of the hydraulic fluid as it flows. Given a particular height and width of a hydraulic channel, the depth or shape of the hydraulic channel can impact the flow or pressure or both of hydraulic fluid within the hydraulic channel. For example, increasing the depth of a hydraulic channel from front 152 to rear 154 of the mat 120, for example from 1 inch to 2 inches, with a smooth gradient or slope of the channel floor increasing the depth, can help keep pressure low while increasing flow. In reverse, if depth decreased from front to back of the mat, pressure would increase as vehicles pushed hydraulic fluid through the hydraulic channel, while keeping flow equal. Similarly, if, for example, the hydraulic channel were cone-shaped and decreasing in diameter from front to back of the mat, pressure would increase substantially while flow would remain constant or decrease as hydraulic fluid moved through the hydraulic channel. In some examples, maintaining and maximizing flow can be more important than working at very high pressures, in which case most parts and design considerations can be informed by the objective to maintain low or steady pressures while maximizing flow.

Several other design or structural elements can be incorporated into the hydraulic channel construction in order to facilitate the full compression of the hydraulic channels and increase or maximize hydraulic fluid flow. In the event that a hydraulic channel is not fully compressed, for example if the top surface 136 of the mat 120 is depressed only 70% of the way down to the bottom surface 138 of the mat 120, perhaps because the vehicle driving over the mat 120 is too light, then there can be a disproportionately large loss in performance and efficiency because fluid can slip backwards through an open slit at the bottom of the partially uncompressed channel, thus regressing back toward the front 152 of the mat 120. If, for example, the mat were compressed 70%, it is possible that only 40% of the hydraulic fluid contained within the hydraulic channel would be pushed forward into the energy conversion system 160 and not the corresponding 70% of the hydraulic fluid because some amount of fluid recedes through the uncompressed portion of the channel (we sometimes refer to this as "leakage"). The ability to fully compress the hydraulic channels under various operating conditions, thus avoiding leakage, can help maintain high system performance and efficiency.

Referring to FIG. 8, in some examples, to help increase or maximize hydraulic flow and reduce or minimize leakage, the hydraulic channel 122 can be partitioned vertically into multiple layers so that each hydraulic channel 122 includes multiple smaller, substantially flat sub-channels 164. For example, a hydraulic channel 122 that is 1 inch tall, 1 inch wide, and 4 feet long, can be split into 4 sub-channels 164 stacked on top of one another and that is each ¼ inch tall, 1 inch wide, and 4 feet long. In this example, a vehicle that may only partially compress the whole hydraulic channel 122 (in the example, 1 inch tall) could still fully compress the top two sub-channels 164$a$, 164$b$, partially compress the third sub-channel 164$c$, and not compress the bottom sub-channel 164$d$. As a result, leakage would occur only in the third sub-channels 164$c$, and no fluid flow would occur at all in the bottom sub-channel 164$d$. This configuration can allow a greater portion of the hydraulic fluid to be pushed forward than if the hydraulic channel 122 were not divided into sub-channels 164. Theoretically, with enough sub-channels 164, the proportion of hydraulic fluid pushed forward through the sub-channel 164 could exactly match the proportion of the height of the overall channel 122 that is compressed—meaning, if the channel 122 is compressed 70%, then 70% of the hydraulic fluid contained in the channel 122 will be pushed forward because of the division of the channel 122 into a sufficiently large number of sub-channels 164.

The materials used to divide the sub-channels 164, referred to as dividers 166, can be the same or similar to the material used for the vertical dividing walls 156 separating adjacent channels 122. The dividers 166 can be flexible transversely in order to enable an undulating motion forward and backward in line with the length of the channel 122 and the direction of hydraulic flow. In some examples, the dividers 166 are not flexible from side to side. The dividers 166 can maintain a flat, horizontal orientation relative to the top and bottom surfaces 136, 138 of the mat 120. The dividers 166 can be connected to the dividing walls 156 by various mechanisms, ranging from rubber manufacturing processes if the dividing walls 156 and dividers 166 are molded, poured, or cut as a single piece, to adhesion processes using industrial liquid, gel, or spray adhesives, heat, or other processes.

One or more parts, flaps, textures, ribs, or other materials (referred to here collectively as parts), oriented transversely to the direction of hydraulic flow, can be connected to or embedded in the bottom surface 138, the top surface 136, or the dividing walls 156 of the channel 122, or a combination of any two or more of them. These parts can help usher the hydraulic flow in the desired direction (e.g., from the front edge 152 to the rear edge 154 of the mat 120), e.g., in order to increase or maximize hydraulic flow through the channel. These parts can take different shapes, forms, and sizes.

Figure 9A:
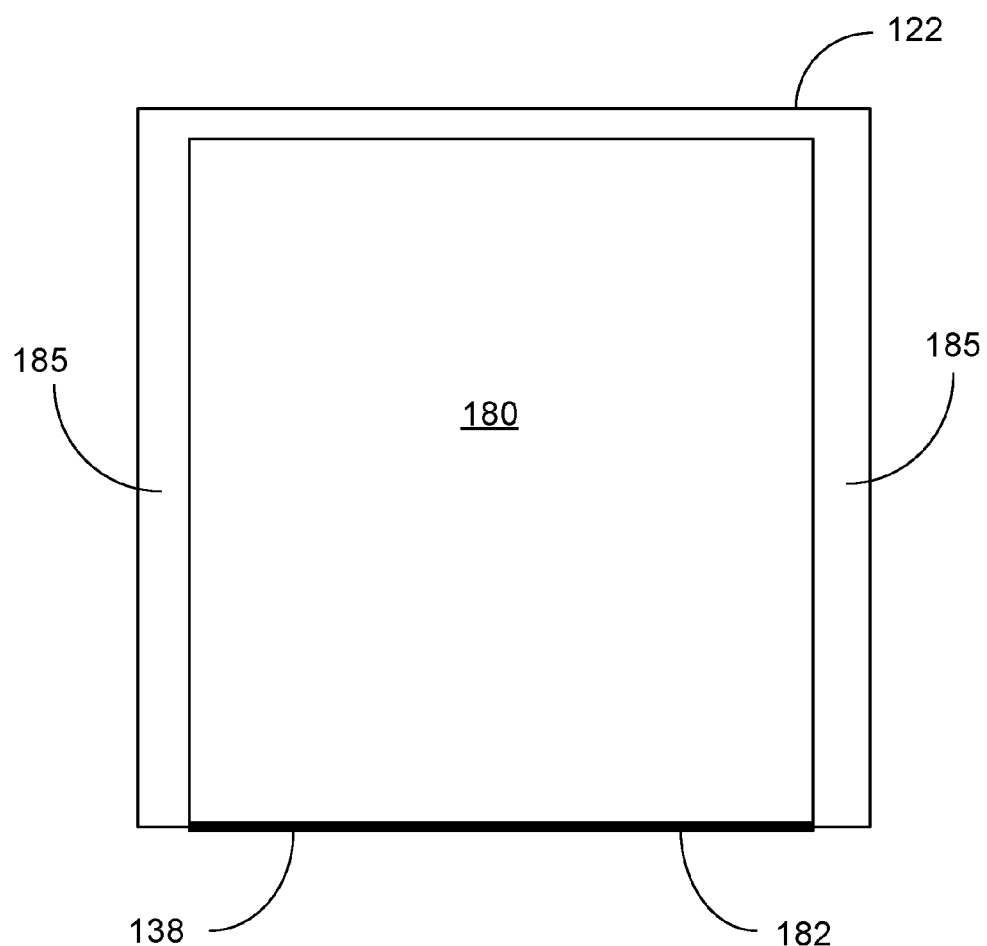
FIGS. 9A and 9B are a front view and a cutaway view, respectively, of a hydraulic channel with flap valves.
Figure 9B:
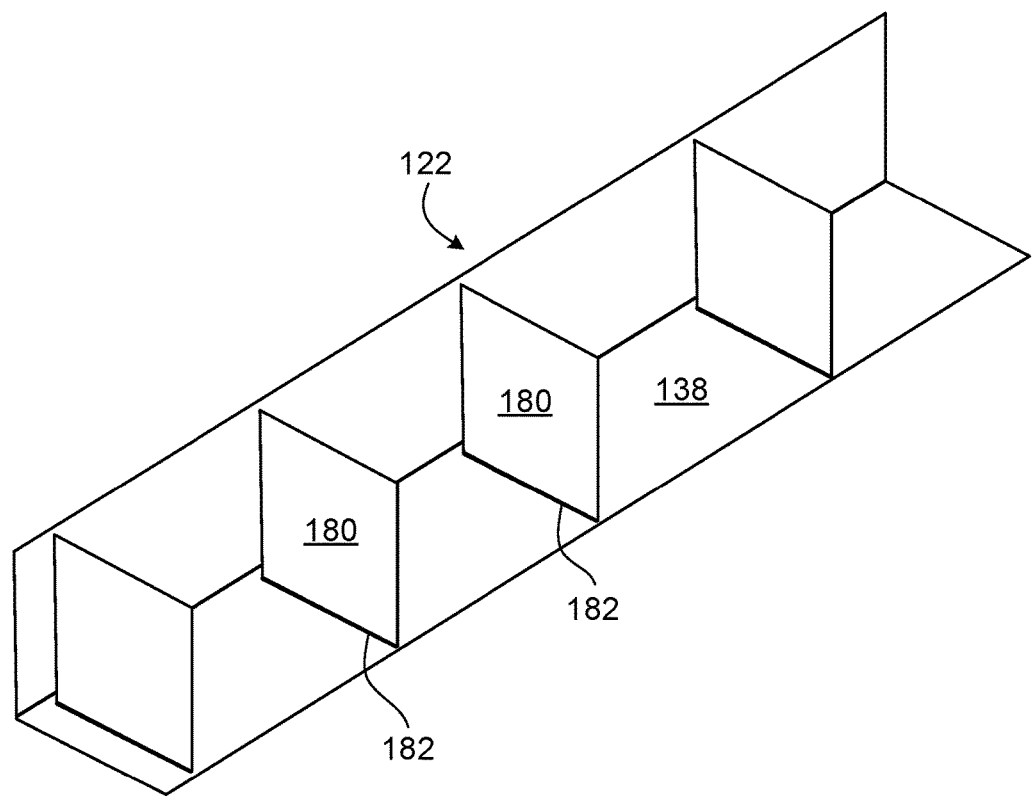

Referring to FIGS. 9A and 9B, in some examples, modified rectangular one-way flap valves 180, roughly the same dimensions as the height and width of each hydraulic channel 122, can allow passage of hydraulic fluid forward through the hydraulic channel while blocking leakage or the backflow of hydraulic fluid. The flaps 180 can be soft and flexible (like the materials used for the dividers or walls) or rigid (e.g., fabricated from a light plastic). The flaps 180 can be angled forward slightly (e.g., between about 1 to about 45 degrees in the direction of the fluid flow relative to an upright position) to reduce or minimize the inertia needed for the hydraulic fluid to push them forward and flow through the hydraulic channel 122. The flaps 180 can be connected on one side of the hydraulic channel 122, for example the bottom surface 138, and pivot forward and backward on a hinge 182 capable of handling millions of back and forth movements. The flaps 180 can be implemented with slight gaps 185 between the other three walls of the hydraulic channel (e.g., the dividing walls 156 and the top surface 136), where the flap 180 is not connected, to still enable the hydraulic fluid to refill the hydraulic channel 122 after compression and return to rest position, but to do so more slowly while still reducing or minimizing leakage during the act of compressing the mat and pushing the hydraulic fluid forward. As fluid is pushed through the length of the entire hydraulic channel 122, the flaps 180 can open and fall forward, like dominos, as much as the mat is compressed, flattening with the mat completely upon full compression. Then the flaps 180 can return to an upright position once the flow of hydraulic fluid stopped, the force against the flap 180 was not enough to push it forward/down, or the hydraulic fluid started flowing backward to refill the hydraulic channel 120.

Figure 10:
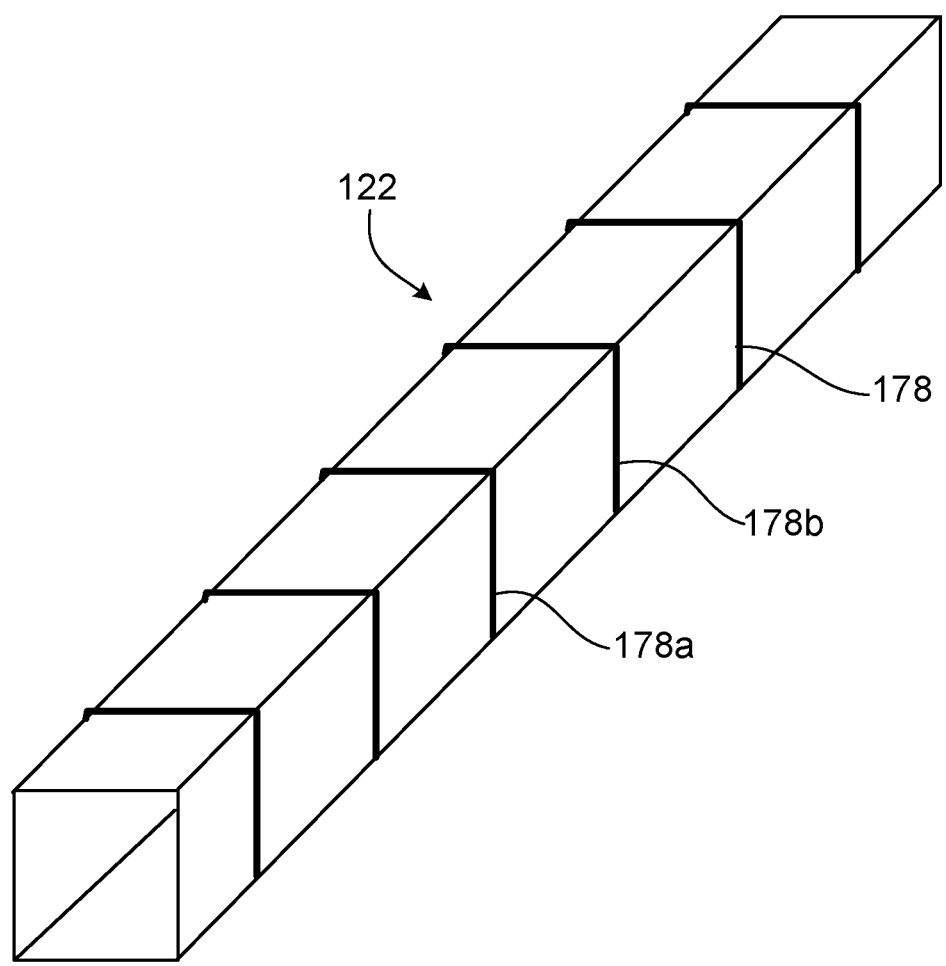
FIG. 10 is a perspective view of a hydraulic channel with hinged gates.

Referring to FIG. 10, in some examples, hinged gates 178, posts, or frames can be embedded in the dividing walls 156 of the hydraulic channel 122 at even or uneven intervals along the length of the hydraulic channel, for example every 4 inches, to help collapse the top surface 136 of the mat as vehicles move across the mat 120. These elements can help create the undulation in the top surface 136 of the mat 120 as the weight of a vehicle depresses the top surface 136 of the mat and the vehicle moves forward. A series of collapsible gates 178 embedded in the dividing walls 156 can create a domino effect (e.g., as discussed above for the internal one-way flap valves). As a vehicle drives over the mat 120 and collapses one such particular gate 178a, the forward and downward motion of the gate 178a can begin to push the adjacent gate 178b forward and down, reducing the inertia faced by the vehicle to push down the following gate 178b. The gates 178 can be made of thin, rigid metal wire frames, hard lightweight plastic frames, or rubber frames that are more dense than the dividing walls 156. The gates 178 can be embedded or formed in the dividing walls 156 during the rubber manufacturing process, or can be installed after the mat is fabricated using a range of processing techniques.

Figure 11:
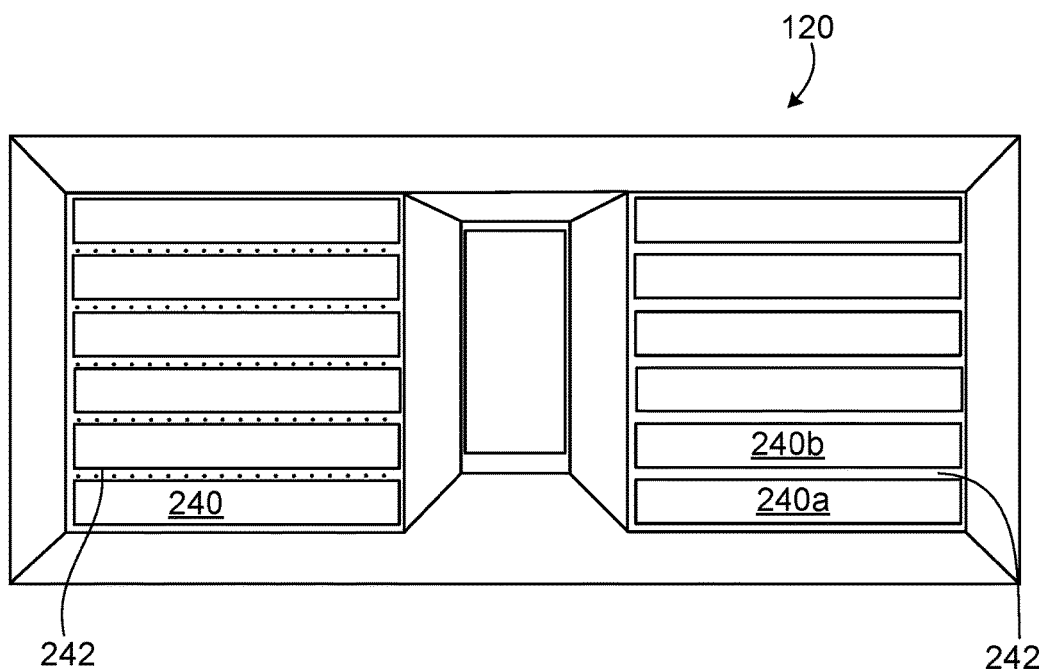
FIG. 11 is a top view of a mat with rigid plates.

Referring to FIG. 11, in some examples, structures mimicking tank treads can be formed in the top surface 136 of the mat 120. For instance, a series of hard, rigid plates 240 or strips of material can be formed in or on the top surface 136 of the mat 120. The plates 240 or strips can extend the width of the mat 120 or each half of the mat and can only a few inches in length, for example 2 inches, with hinges 242 or flexible connections between each plate 240 or strip. When a vehicle depresses an area of the mat 120 with the footprint of its tire, the rigid plate 240a that extends transversely across the mat is depressed, thus distributing the force of the vehicle across a wider area and causing a greater number of hydraulic channels to be pinched. Then, once the rigid plate 240a is depressed or in the process of being depressed, an adjacent plate 240b will be pulled down through its connection 242 to the former plate 240a, initiating the depression process of the following plate 240b and assisting the vehicle in fully compressing the channels along the entire length of the mat.

Figure 12:
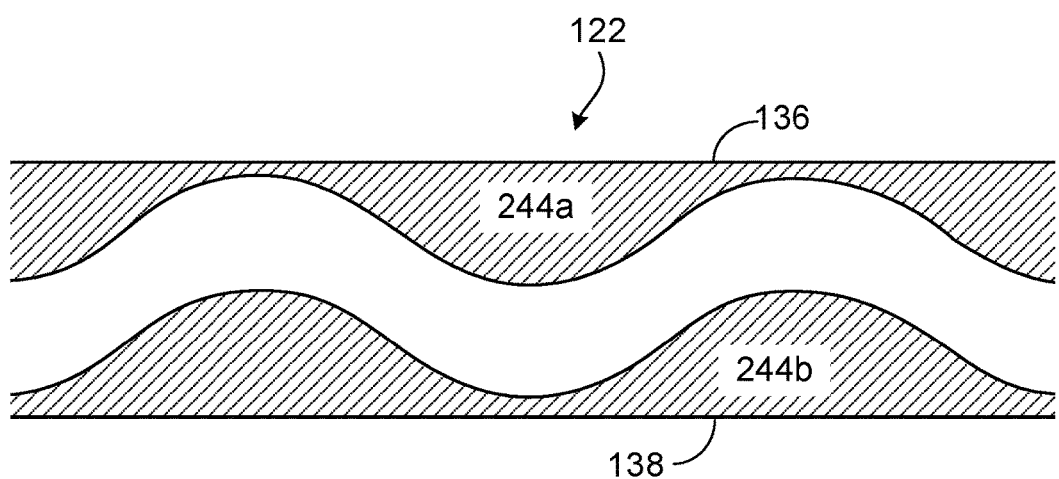
FIG. 12 is a side view of a hydraulic channel with undulations.

Referring to FIG. 12, in some examples, a zipper concept can be implemented in which interlocking or opposite edges come together as the mat is compressed to fully seal the internal spaces and push the hydraulic fluid forward. Protruding edges, parts, teeth, or other components attached to or embedded in opposite walls of the channel, for example the ceiling and the floor, can be pushed together as a vehicle drives over and depresses the mat. For instance, in FIG. 12, undulations 244a are formed in the top surface 136 of the hydraulic channel 122 and matching, opposing undulations 244b are formed in the bottom surface 138 of the hydraulic channel. The opposite edges will mesh together like interlocking gears, nearly completely sealing the space between the channel ceiling and floor. In some cases, a zipper can be implemented by forming opposing rubber undulations in the ceiling and floor during the rubber manufacturing process using opposite or inverted molds for either side.

Looking at a cross-splice or side view of an illustrative example of the undulations, the dimensions of the crests, troughs, amplitudes, and wavelengths of the undulations may vary; however, if the height of the channel is 1 inch, then the maximum amplitude possible is ½ of the height or ½ inch. Given a mat length of 4 feet, the wavelength can range from about 1 inch to about 2 feet, e.g., from about 4 inches to about 12 inches. The undulations can be formed using similar rubber compounds as for the base or top layer of the mat and can be composed of materials of varying densities depending on the desired rigidity or elasticity of the material. The undulations can be formed independently for each channel, or can be molded onto the internal sides of the bottom and top layers of the mat during the manufacturing process and stretch across the width of the mat, or each half of the mat, like wave or ripples flowing in the direction of vehicular traffic. By using varying densities or dual-compounds in the rubber manufacturing processes, these undulations can provide structural support for the mat and assist the hydraulic fluid in flowing in the desired direction by displacing the fluid with the opposing undulations upon partial and full compression of the mat.

To fill the hydraulic system with fluid, a port with a built in one-way valve can allow fluid only into the hydraulic system and not out. This port can have a specialized connection that matches with specific hoses and end caps to prevent vandalism or unauthorized work on the end-to-end system. The port can be built into the mat during the manufacturing process and can be located on any side or surface of the mat. The port can have a built in pressure gauge to facilitate pressurizing the hydraulic system to a desired level. A second hydraulic port can serve as a drainage connection to empty the hydraulic fluid from the system when and as needed. The second port can have a built-in one-way valve that only allows fluid out of the hydraulic system and not in.

Referring again to FIG. 7, the hydraulic system begins at the first endpoint at the front edge 152 of the mat 120 with the hydraulic channels 122 and ends in the central section 140 of the mat 120 with the second endpoint, which absorbs the slug of hydraulic fluid pushed forward through the hydraulic system by each vehicle and creates back pressure to return the hydraulic fluid to the hydraulic channels 122 and to rest position. In some examples, the second endpoint can be an enclosed chamber such as a hydraulic bladder accumulator 128. A bladder accumulator is pressurized to a baseline pressure by inserting compressible gas (for example, nitrogen) between an outer rigid shell 168 of the accumulator (e.g., made of steel) and a flexible internal bladder 170 (e.g., made of an elastic rubber) that receives the fluid. As hydraulic fluid is pushed into the bladder 170 of the accumulator 128, the bladder 170 expands, occupying more volume within the accumulator 128 than in its original state and compressing the gas in a chamber 172 between the bladder 170 and the outer rigid shell 168.

As the gas within the chamber 172 of the accumulator 128 is compressed, the pressure of the gas is increased. The accumulator 128 can let more hydraulic fluid enter the bladder 170 up until the point where the force pushing the hydraulic fluid into the bladder 170 is equal to or less than the force of the compressed gas in the chamber 172 pushing back against the bladder 170. Once the force of the compressed gas in the chamber 172 pushing against the bladder 170 is greater than the force of the hydraulic fluid trying to enter the bladder 170, the bladder 170 will contract and the hydraulic fluid will be released out of the bladder 170 back in the direction it entered from (e.g., back toward the hydraulic channels 122). The baseline pressure of the bladder 170 will be set such that each vehicle passing over the mat can fully push hydraulic fluid into the accumulator 128 as the vehicle moves across the mat 120 and up until the point where the vehicle drives off the mat 120. Throughout the process, as hydraulic fluid is being pushed into the accumulator 128, the pressure inside the accumulator 128 increases. At the moment the vehicle drives off the mat, the pressure inside the accumulator 128 is significantly greater than the pressure within the hydraulic channel 122 that the vehicle just passed over. Therefore, hydraulic fluid will be pushed out of the bladder 170 and back into the hydraulic channels 122. The pressures in the hydraulic channels 122 are rebalanced and the accumulator 128 is returned to its baseline pressure. Once pressure levels are balanced across the hydraulic channels 122 and the accumulator 128, the hydraulic system is at rest and is ready to receive the next compression from the next vehicle.

In some examples, the placement of the gas and hydraulic fluid can be reversed, such that the rubber bladder 170 is filled with compressed gas, and hydraulic fluid enters the chamber 172 between the steel shell and the bladder. In these examples, as hydraulic fluid enters the chamber 172, the bladder 170 will contract and the gas pressure in the bladder 170 will increase. As in the first arrangement described above, the intention is for the accumulator 128 to fully absorb all of the hydraulic fluid pushed by each vehicle passing over the mat 120 and for the accumulator to be sized and pressurized at rest such that once the vehicle drives off the mat the hydraulic fluid will be quickly forced out of the accumulator 128 and back into the hydraulic channels 122 in order to be ready to absorb energy from the next passing vehicle.

If, for example, the pressure within the accumulator 128 were too high at rest, there would come a point while the vehicle was still on the mat 120 but no more hydraulic fluid would be able to be pushed into the accumulator 128 because the increased backpressure from the compressed gas in the chamber 172 was greater than the force applied by the vehicle on the hydraulic channels 122. If, for example, the pressure within the accumulator 128 were too low at rest, the vehicle would easily push all of the hydraulic fluid from the hydraulic channels 122 into the accumulator 128, but the resulting increase in pressure within the bladder 170 may not be high enough once the vehicle drives off the mat 122 to push the hydraulic fluid back into the hydraulic channels 122 quickly enough to absorb energy from the next axle pair or vehicle. Therefore, calibration of the accumulator 128 can be achieved when the hydraulic fluid displaced by a single vehicle, or a single pair of tires, will increase the pressure within the accumulator 128 (e.g., within the bladder 170) right up to the limit of the accumulator 128, so that all of the hydraulic fluid is fully absorbed into the accumulator 128 and is quickly pushed back into the hydraulic channels 122 after the vehicle drives off the mat.

Because the hydraulic system is pressurized and is sealed with no air in it, and given the moderate response time of the system to return hydraulic fluid from the accumulator 128 back into the hydraulic channels 122 (for example, tenths or hundredths of a second), the hydraulic system experiences negligible rebound or oscillation of hydraulic fluid 122 in the hydraulic channels 122). If, for example, the hydraulic system had pockets of air contained within the hydraulic channels 122, there could be a rebound-effect or oscillation of hydraulic fluid moving back and forth between the two sealed endpoints, until the system settled at rest. If the hydraulic fluid were returned from the accumulator 128 into the hydraulic channels 122 with extreme force (e.g., in a matter of milliseconds), there could be oscillation from the momentum and pace of the hydraulic fluid returning into the hydraulic channels 122. However, because the hydraulic system contains no air and the hydraulic fluid is forced out of the accumulator 128 at a pace comparable to the pace hydraulic fluid is pushed into the accumulator 128, there is generally little to no rebound effect. Moreover, the hydraulic fluid will exit the accumulator 128 after being pushed in by a vehicle due to the pressure differential created when the vehicle drives off the mat. Therefore, even if the hydraulic fluid is not completely at rest within the hydraulic channels 122 when the next axle or vehicle drives onto the mat, the full volume of fluid contained within the hydraulic channels 122 will still be the same and will be fully pushed into the accumulator 128 by that next vehicle, thereby not significantly affecting the system's performance or energy potential.

For a vehicle to push hydraulic fluid through a closed loop hydraulic system, the vehicle has to push the entire volume of hydraulic fluid contained within the closed loop system. For a visual example, if the vehicle enters a circular closed loop system at 12 o'clock and moves the hydraulic fluid clockwise, all of the hydraulic fluid standing between 12 o'clock and traced clockwise all along the circumference of the circle back to 12 o'clock will move in unison. If instead that system is sealed at 12 o'clock and at 6 o'clock, there is half the volume of hydraulic fluid as there is in the circular closed loop system. Reducing the volume of hydraulic fluid contained within the system reduces the inertia to be overcome for a vehicle to push hydraulic fluid through the system.

The hydraulic system described here can be implemented in a straight linear path or in a circuitous manner. For example, as shown in FIG. 7, the path of hydraulic flow can include two 90 degree turns: a first turn 174 to redirect the hydraulic flow from the direction of vehicular traffic toward the central section 140 of the mat 120, and a second turn 176 to redirect the hydraulic flow against the direction of traffic and toward the accumulator 128 in the central section 140 of the mat 120. This configuration makes use of the length of the mat twice, thus increase the distance over which energy can be harnessed from the vehicular traffic.

The layout of the hydraulic system components can be varied and rearranged, e.g., to improve or optimize performance. For example, changing the order of the mechanical connections to the energy conversion system 160, the energy generation system, or the hydraulic accumulator 128 based on the specifications for a particular energy harvesting system 100 or installation site can impact performance. The inclusion of one or more of the additional components can allow for accommodation of a wider range of operating conditions (for example, roadway and vehicular traffic) and can expand the capacity of the energy harvesting system 100 or the range of performance capabilities. For example, including a secondary hydraulic fluid accumulator or reservoir at the front edge of the hydraulic system can increase the speed of the refilling the hydraulic channels 122 and returning the end-to-end system to rest position. If a second axle or vehicle drives over the mat before the hydraulic fluid returns to the hydraulic channels 122 from the hydraulic accumulator 128 at the far end of the system, placing a second accumulator or reservoir at the front of the system can help to more quickly refill the hydraulic channels 122 in the interim (for example, in hundredths or tenths of seconds) until the hydraulic fluid rebalances across the entire hydraulic system (for example, in tenths of or whole seconds).

The hydraulic fluid itself can be commercially available hydraulic fluid available from many different vendors. The appropriate fluid can be selected based on specific operating conditions and desired system specifications. The hydraulic fluid used the end-to-end system described here is incompressible. Incompressible fluids are typically oils, such as synthetic oils or oils made from organic biomaterials. Incompressibility creates a positive displacement interaction, meaning that whatever space within the mat that is displaced by passing vehicles directly moves the fluid an equal amount through the system. Therefore, little to no force transferred from the vehicles to the hydraulic system is absorbed by the hydraulic fluid itself, for example through compression, flex, or other mechanical losses, but rather the force from the vehicles is transferred directly through the system to the subsequent mechanical connections and interactions in the end-to-end system.

Energy Conversion System

Figure 13:
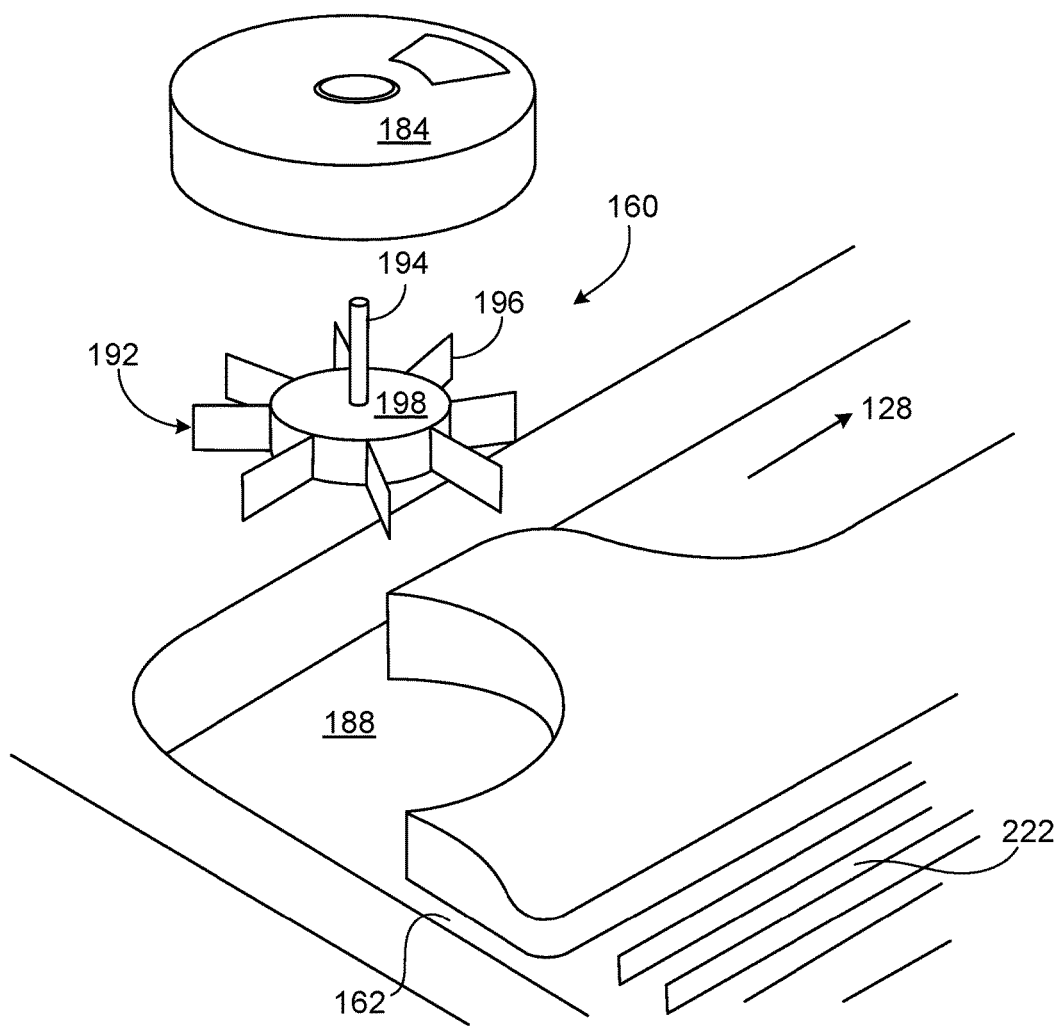
FIG. 13 is a view of the interior of a mat.

Referring to FIGS. 7 and 13, the energy conversion system 160 is configured to convert kinetic energy from passing vehicles into a different form of energy, such as mechanical motion. The energy conversion system 160 includes one or more objects, sometimes referred to as energy conversion mechanisms, such as a turbine 132, that are placed in the path of the flowing hydraulic fluid to convert the hydraulic pressure and flow into mechanical motion, such as torque and displacement (e.g., linear motion or rotational motion). The energy conversion mechanisms 132 can be connected to a generator in order to produce electricity. Part way along the hydraulic fluid's passage from the hydraulic channels 122 to the hydraulic accumulator 128, the hydraulic fluid passes through the energy conversion mechanisms 132 to convert hydraulic flow into mechanical energy, for example in the form of rotational or linear motion. The energy conversion system 160 is tasked with efficiently converting between different forms of energy and handling pulses or bursts of high-force, low-pressure hydraulic flow. The components, materials, connections, or other design elements selected can influence the performance and specifications of the energy conversion system 160. The energy conversion system 160 adheres to certain specifications of the energy harvesting system 100, for example maintaining a low height profile to fit within the central section 140 of the mat 120.

Referring also to FIG. 14, the energy conversion system 160 can include an inlet port 162, a nozzle 183, a housing 184, one or more energy conversion mechanisms 132, and an outlet port 186. Each of these components of the energy conversion system 160 can be varied across a number of different parameters. The energy conversion mechanisms can include one or more of an impeller, a gerotor, an expandable bellows, or other positive displacement mechanism, a linear piston, a coupled hydraulic motor or generator, or a combination of any two or more of them.

The hydraulic fluid that is pushed through each hydraulic channel 122 merges at the space 158 toward the rear edge 154 of the mat 120, turns 90 degrees toward the central section 140 of the mat, and enters the housing 184 of the energy conversion system 160 through the inlet port 162. The inlet port 162 can be made of industrial grade parts, e.g., steel products with compliant plated surfaces, designed for use in all types of hydraulic systems and in rugged environments. The opening of the inlet port 162 can be any of a variety of shapes, such as a circular, rectangular, or square opening. The diameter of the opening can be between about ½ inch and about 3 inches. An example opening can be a rectangular or square opening with an area of about one square inch. The inlet port 162 can be constructed from metal, plastic, rubber, or other materials. An example inlet port 162 can be made of steel. In some examples, the bottom surface 138 of the mat 120 can be designed to fit around the inlet port 162. In some examples, the inlet port 162 can be connected to shaped rubber rings, seals, skirts, or other components that can create a smooth, guided pathway for the hydraulic fluid to flow from the hydraulic channels 122 directly into the opening of the inlet port 162. In some examples, the inlet port 162 can be permanently secured to the edge of the hydraulic channels 122, and a short piece of tube, hose, or pipe, e.g., ranging from 1 to 6 inches in length, can connect the inlet port 162 to the housing 184. At each connection point, hydraulic seals, fasteners, or other connector accessories can be used to ensure strong, stable connections and to reduce or eliminate leaking.

The nozzle 183 marks the physical connection between the inlet port 162 and the housing 162. The nozzle 183 can be shaped and dimensioned to effectively transfer the flow of hydraulic fluid to the energy conversion mechanisms 132 to actuate the energy conversion mechanisms 132. In some examples, the nozzle 183 can create a jet stream of fluid that is directed at an impeller's blades and pointed or shaped or both to obtain a high rotational velocity of the impeller. The nozzle 183 can be constructed from metal, plastic, or rubber, or other materials, and can be secured in place with seals or fasteners or both to reduce or eliminate leaking. The shape and dimensions of the nozzle 183 and the opening in the nozzle 183 can be varied to enhance or optimize performance based on different operating conditions or requirements. For example, in order for the nozzle 183 to fit on top of or within the inlet port 162, base shapes and diameters or the nozzle 183 and the inlet port can match. An example nozzle can have a square base with a diameter of about 1 inch and length of between about 1 and 2 inches. In some examples, the nozzle 183 can range, for example, from about ½ inch to about 3 inches in diameter, and from about ½ inch to about 4 inches in length. The opening or slit of the nozzle 183 that guides the shape and direction of the jet stream can be a vertical slit so that fluid is dispersed evenly and directly along the outside edge of each impeller blade to maximize force and leverage applied to the impeller and rotational velocity achieved from the impeller. The nozzle slit can be of varying dimensions (widths and length), as well as shape and size, to change the fluid flow rate and jet stream shape, and ultimately to impact the rotational velocity of the impeller. For example, a ½ inch slit size in comparison to a 1 inch slit size will increase pressure or force of the jet stream on the impeller blades, but will hold steady or decrease flow rate. The nozzle and related connections can be designed in such a way to make the nozzle interchangeable to allow for different configurations and characteristics of the jet stream to enhance or optimize the performance under different operating conditions.

The housing 184 of the energy conversion system 160 can be made of a solid, compact steel cube, or of several stacked layers of steel. The housing encloses the rotating or moving energy conversion mechanism 132 and seals in the hydraulic fluid. The housing 184 can be situated in the central section 140 of the mat 120 and fits between the bottom surface 138 and the top surface 136 of the mat 120. An example housing 184 can have dimensions of about 4 inches wide, 4 inches long, and 3 inches tall. In some examples, the width and length of the housing 184 can each range from about 1 inch to about 12 inches, and the height of the housing 184 range from less than about 1 inch to about 6 inches. A range of materials and manufacturing methods can be used to fabricate the housing 184. For example, materials for the housing include metals, such as iron, steel, bronze, brass, or aluminum; durable rubbers; hard, low-friction plastics, or other material. For instance, materials that are capable of withstanding the maximum load of a vehicle driving over can be used for the housing. The housing 184 can be manufactured by molding, cutting, milling, or other techniques. The housing defines a central cavity 188 therein where the energy conversion mechanism 132 is situated. The central cavity 188 can be cut, milled, or molded in one or several steps. In some examples, the central cavity can present tight tolerances to maximize torque and rotation generated by the energy conversion mechanisms 132. The housing 184, the central cavity 188 formed therein, or a conduit 190 or funnel or other type of flow path leading into and through the central cavity 188, or a combination of any two or more of them can be designed to carry the hydraulic fluid through the energy conversion mechanism 132 to effectively create torque and rotation. The housing 184 can be well sealed to reduce or prevent leaks or loss of pressure, e.g., using gaskets, seals, low friction bearings, or other sealing components.

Figure 16A:
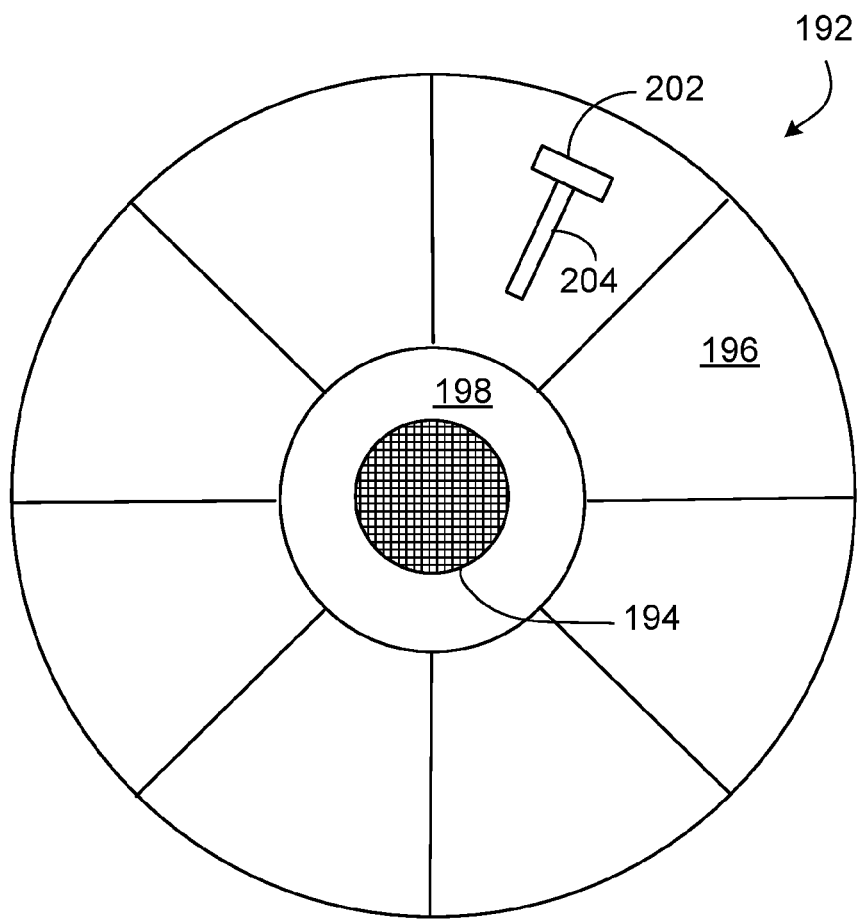
FIGS. 16A-16C are diagrams of impellers.
Figure 16B:
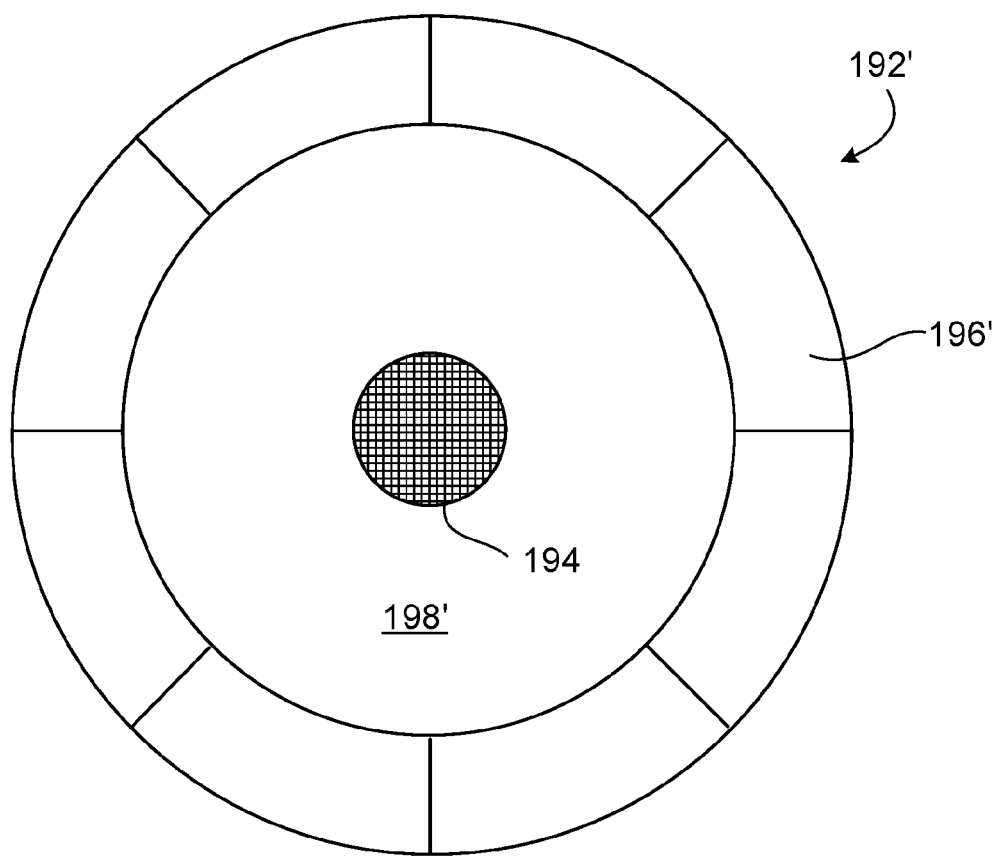
Figure 16C:
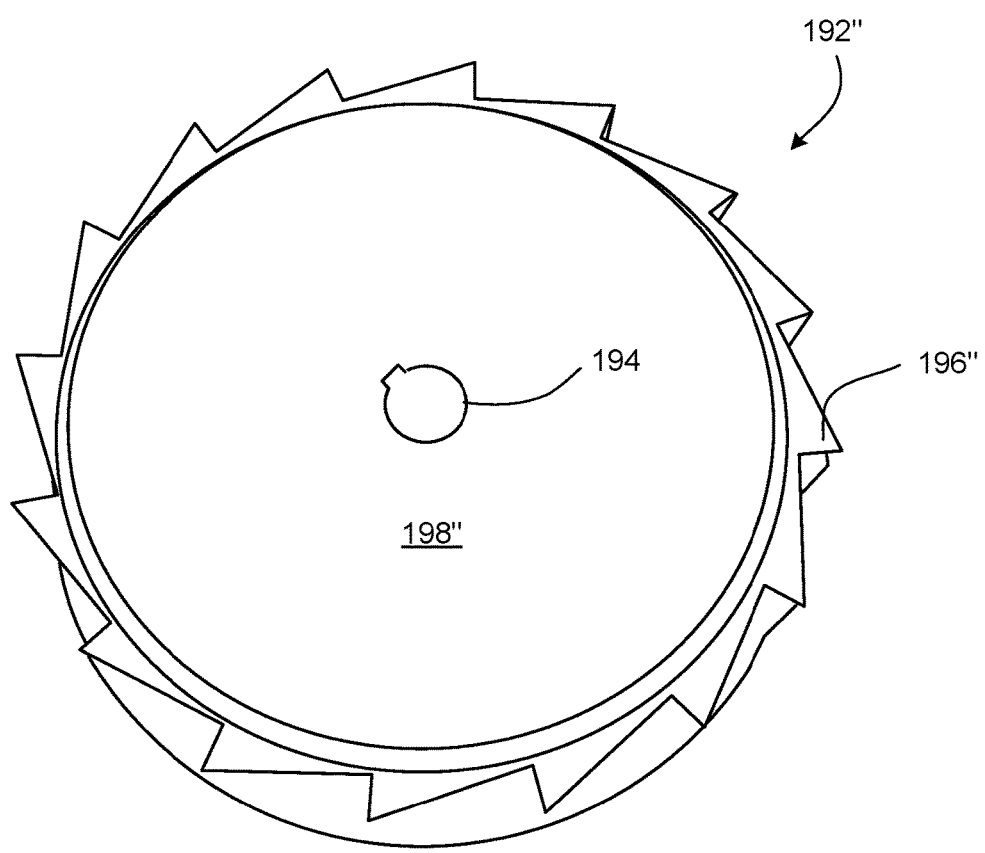

The specific type of energy conversion mechanism 132 can depend on factors such as site conditions or requirements. Referring to FIGS. 16A-16C, in some examples, an impeller 192 is used as an energy conversion mechanism. An impeller is a rotor used to change the characteristics of hydraulic fluid, for example to decrease the pressure and flow, and to generate torque and rotation. The impeller 192 includes a flat disc or circular plate (sometimes called a central hub 198) oriented horizontally to the bottom surface 138 of the mat 120 and connected to a central axle 194, for example made of carbon steel. The axle 194 can pass through the center of the impeller 192. On a bottom side of the impeller 192, the axle 194 can rest on the base of the housing 184 or on a sealed endcap, and on the other side the axle 194 can pass through a seal or a low-friction bearing. The impeller 192 can include 3 or more blades 196 of varying orientation, dimensions, and curvature. The blades 16 receive the force of incoming hydraulic fluid and rotate on the central axle 194.

The impeller 192 acts as a lightweight mechanism that has minimal inertia and quick response so that any amount of hydraulic fluid passing through the housing will spin the impeller 192. The impeller 192 can be made of plastic or light metals, such as aluminum, to help ensure high responsiveness of the impeller 192. The shape or size of the impeller 192 depends on the desired characteristics of the impeller 192. The impeller 192 can be about 3 to 6 inches in diameter, and about 1 to 2 inches tall. The impeller 192 can have 10 to 30 blades 196 connected to a central hub 198 and ranging from 1 to 2 inches in length, e.g., depending on the diameter of the central hub 198. The impeller blades 196 can be less than about ¼ inch thick, and the height, length, orientation (angle), or uniformity (of dimensions across the length) of the blades 196 can vary widely to fit a range of end-to-end system specifications and to enhance or optimize fluid flow, rotational velocity, or torque.

Referring again to FIG. 14, the inside of the housing 184 can be configured to enhance or optimize the performance of the impeller 192. In some examples, the cavity 188 defined by the housing 184 can be a cylindrical chamber just large enough to fit the impeller 192. For instance, if the impeller 192 is 1 inch tall and 6 inches wide, the chamber 200 can be about 1¼ inches tall and 6¼ inches wide. In these examples, the hydraulic fluid enters through the inlet port 162 and nozzle 183, fit onto, for example, a square entrance funnel 1 inch wide, 1 inch tall, and 2 inches long, and fill the entire chamber 188 of the housing 184 while spinning the impeller 192, before exiting through an exit funnel (e.g., of similar dimensions to the entrance funnel) and the outlet port 186 on the opposite side of the housing 184. In these examples, the design of the nozzle and jet stream can impact the performance of the impeller 192.

Figure 15:
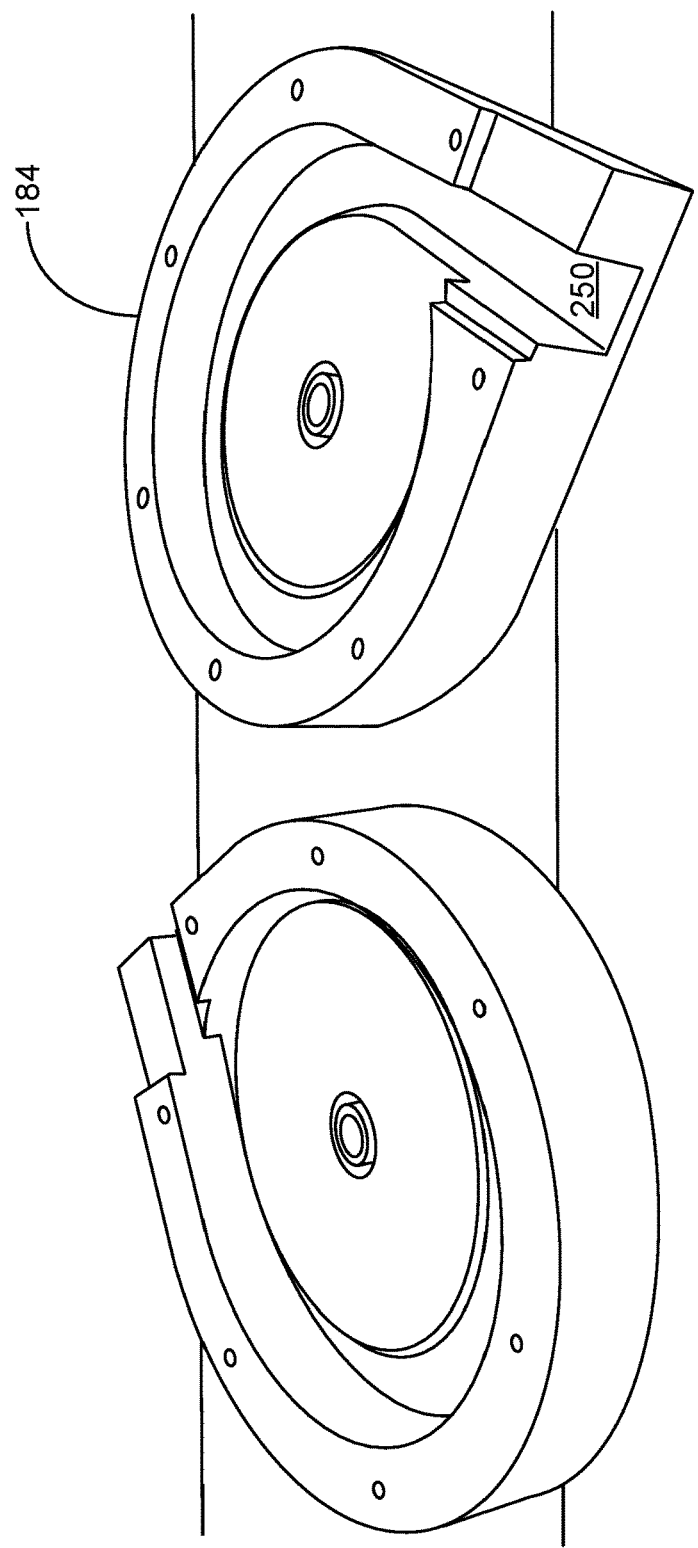

Referring to FIG. 15, in some examples, the housing 184 can be designed as a volute, which is a funnel 250 that maintains an even area (e.g., 1 square inch) as the volute curves 270 degrees around the impeller in approach to the outlet port 186. The base of the outlet port 186 can be flush (in terms of height) with the top of the inlet port 162, meaning that the funnel gradually rises in height while curving around the impeller 192 so that the end of the funnel sits atop the beginning of the funnel. The funnel can overlap with only a portion of the blades of the impeller, e.g., the outermost portion of the blades, such that the hydraulic fluid in the tunnel initially makes contact with the outer portion of the impeller blades and gradually winds around the tunnel to make contact with the inner portion of the impeller blades. In an example, the impeller blades 196 can be 3 inches long and the funnel can overlap only with the 1 inch measured from the impeller blades' edge furthest from the center of the impeller toward the center of the impeller. In some examples, the funnel can overlap with more or less than 1 inch of the impeller blades. In these examples, the force of the hydraulic fluid contacts many blades 196 simultaneously and pushes the impeller 192 along ¾ of its circumference (as opposed to contacting 1 or 2 blades at a time as in the examples above), creating substantially more torque.

Figure 17:
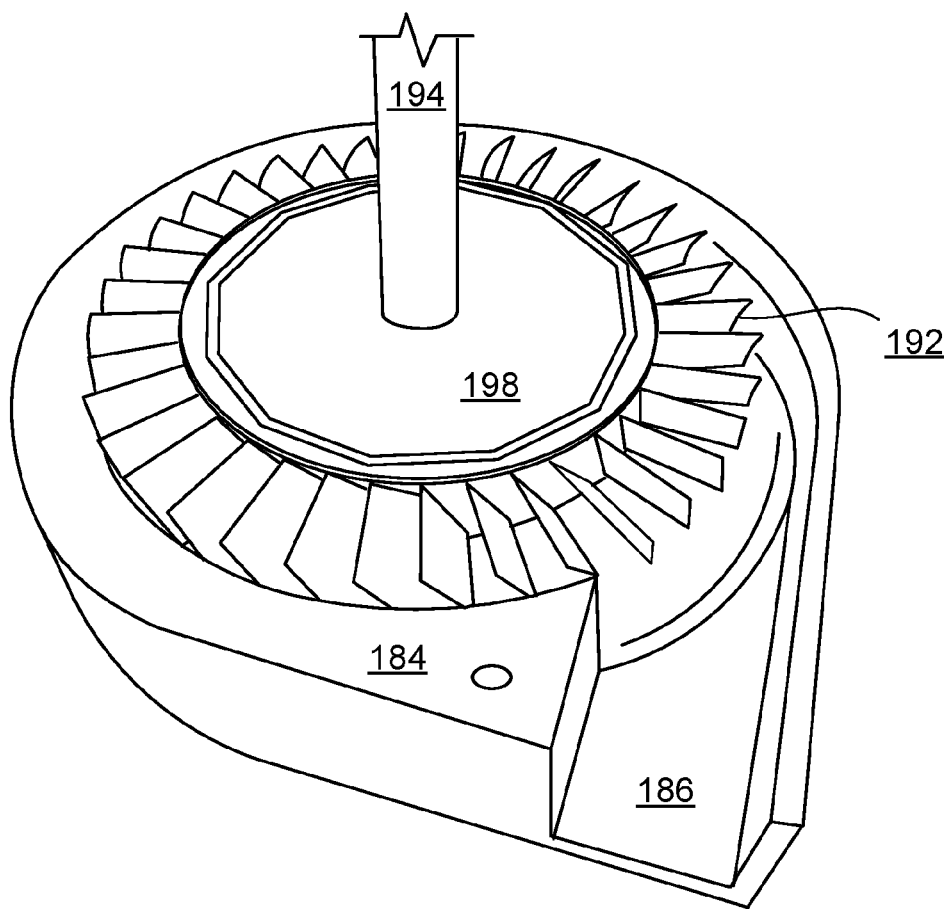
FIG. 17 is a diagram of an impeller.

The impeller 192 of FIG. 16A has long blades 196 and a small diameter central hub 198. The impeller 192' of FIG. 16B has shorter blades 196' and a larger diameter central hub 198'. FIG. 17 shows the impeller 192' of FIG. 16B in its housing 184. The impeller 192" of FIG. 16C has very short blades 196" and a very large diameter central hub 198".

In some examples, features of the impeller 192 can enable real-time adjustments to the specifications of the impeller 192 to enhance or optimize performance under varied operating conditions. Referring again to FIG. 16A, in the example impeller 192, sliding weights 202 installed along the blades 196 of the impeller 192 (shown on only a single blade for clarity). At rest, the sliding weights 202 are positioned at the end of the blades 196 closest to the hub 198 in order to minimize inertia. When the impeller 192 rotates, the blades 196 slide progressively further away from the hub 198 due to the centrifugal force resulting from rotation. Once the impeller 192 is rotating, more weight along the edges of the blades 196 will increase momentum and maximize rotational speed. The weights 202 can be made of a variety of materials, e.g., stainless steel or plated steel. The weights 202 can be spherical or other-shaped beads or can be flat rectangular plates that can connect to the top or bottom edge of each blade, like hardware tracks for sliding doors. A groove 204 or slit can be cut into each blade 196 to provide a guiding track to keep the weights 202 in place as they move back and forth along the edge of the blades 196. Mechanisms to adjust impeller blade length during rotation or the size of the impeller hub could enable adjustments to improve performance.

Figure 18:
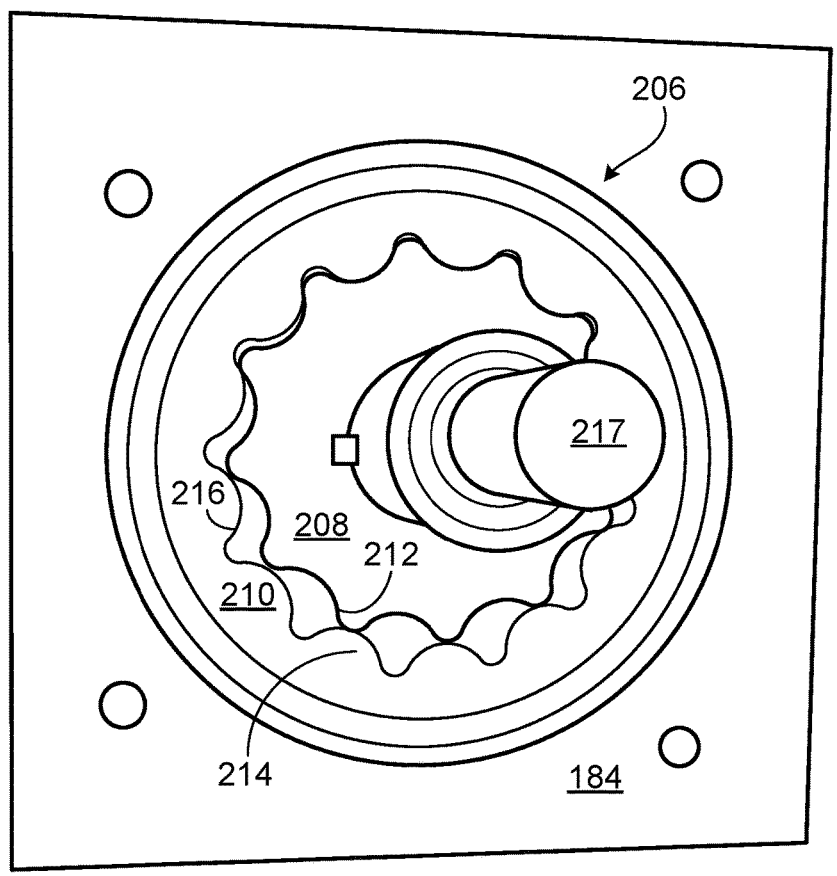
FIG. 18 is a diagram of a gerotor.

Referring to FIG. 18, in some examples, a gerotor 206 can be used as an energy conversion mechanism. A gerotor 206 is a positive displacement pump with an inner rotor 208 and an outer rotor 210. The inner rotor 208 has N teeth 212, and the outer rotor 210 has N+1 teeth 214. The inner rotor 208 is positioned off-center relative to the outer rotor 210, and both rotors 208, 210 rotate together, creating and closing spaces 216 between the rotors' teeth 212, 214. As the spaces 216 expand and contract, suction and compression are created, thereby pulling in hydraulic fluid through the expanding spaces 216 and pushing out hydraulic fluid through the contracting spaces 216. Unlike the impellers 192, which can sometimes experience slippage during rotation (meaning that some portion of the hydraulic fluid slips between the edges of the blades 196 and the housing 184 without pushing the blades 196 forward), a positive displacement mechanism such as a gerotor 206 inherently means that if the rotors 208, 210 move, the hydraulic fluid must move (or if the hydraulic fluid moves, then the rotors must move). Therefore, an energy conversion mechanism such as a gerotor 206 has potential to operate at very high efficiency (e.g., as high as 70%). In some examples, a gerotor designed for rotational speeds of up to about 1000 rpm can be used. Depending on the resistance (e.g., mechanical or electrical resistance) caused by various elements of the system or by the load from the energy generation system, the gerotor can operate at about 100-1000 rpm.

The inner rotor 208 can have any number of teeth 212, for example between 4 and 16 teeth 212, and the outer rotor 210 has one more tooth 214 than the inner rotor 208. This mismatch changes the number of discrete contact points between the two rotors 208, 212 during rotation. Both rotors 208, 210 can have the same height, ranging from about ¼ inch to about 3 inches, e.g., about 1 inch. The inner rotor 208 can have a diameter of about 1½ inches, and the outer rotor 210 is can have a slightly larger diameter (because the inner rotor 208 fits inside of the outer rotor 210), e.g., about 2½ inches. The housing 184 diameter can be slightly larger than the diameter of the outer rotor 210 in order to fully encase both rotors 208, 210 and leave room for ports, connections, fasteners, or other components. For example, the housing 184 diameter can be about ½ inch to about 2 inches larger than the outer rotor 210 diameter, meaning the housing 184 would be about 3 to 5 inches in diameter. The two rotors 208, 210 can be oriented horizontally in the center of the housing 184, rotating around a vertical axle 217.

In some examples, the gerotor 206 can have a single axle 217 (as shown in FIG. 18), such that the inner rotor 208 is directly connected to the axle 217 and the outer rotor 210 is held in place by the housing 184 and rotates when the inner rotor 208 rotates. In these examples, the housing 184 can have tight tolerances with the outer rotor 210, such that a very small gap between the two parts, for example between ¹⁄₁₀₀₀th of an inch and ¹⁄₁₀th of an inch, fills with hydraulic fluid during operation, creating a hydrostatic bearing effect to minimize or eliminates friction. In some examples, the gerotor 206 can have two axles, one for each rotor, such that the axles connect to each rotor from opposite sides and protrude outward to connect with the housing and bearings. In these examples, the hydraulic fluid can still create a hydrostatic bearing effect, however the gerotor 206 can be more stable with two axles and experiences less friction than a gerotor 206 with a single axle 217.

The housing 184 can be manufactured as two halves, one half to hold each rotor. The two halves can be sealed or bolted together or otherwise attached to create a sealed hydraulic chamber inside for the hydraulic fluid to flow and actuate the two rotors. Ports can be formed in the housing (e.g., milled into the housing) to connect the inlet port 162 and outlet port 186 of the housing 184 with the central chamber in which the rotors 208, 210 are contained. Using special materials, "frictionless" labyrinth seals, or custom bearings, friction or leakage can be reduced, thus increasing the energy conversion efficiency for the gerotor 206. In some examples, the gerotor 206 can obtain an overall efficiency above 50% (e.g., as determined from the equation $E_{ovr}=P_{out}/P_{in}=0.0272*T*N/(P*Q)$ where T is torque (inch pounds), N is speed (rpm), P is pressure drop (psi), and Q is flow (gpm))

In some examples, a dual-action linear hydraulic piston can be used as an energy conversion mechanism. The dual-action linear hydraulic piston (sometimes referred to simply as a piston) can convert the flow of hydraulic fluid into back-and-forth linear motion. The piston is positive displacement mechanism: because the hydraulic fluid is incompressible, all movement of hydraulic fluid directly corresponds to movement within the pump. The piston can be a commercially available products. The piston can be made of durable materials, such as steel, plastic, rubber, or other materials. In some examples, the piston can be a straight rod that is roughly the length of the cylinder and that slides back and forth through a sealed connection at one end of the cylinder. The piston can be properly sealed for use with hydraulic fluids at operating pressures ranging from 5 psi to 100 psi, though most hydraulic cylinders are designed to handle pressures ranging from 100 psi to as high as 3,000 psi. The cylinder can have a length between about 4 inches and about 24 inches, e.g., about 12 inches; and a diameter between about ½ inch to 4 inches, e.g., about 1 to 2 inches.

In some examples, a positive displacement mechanism such as an expandable bellows can be used as an energy conversion mechanism. Hydraulic fluid flows into the expandable bellows, and the bellows expands as the volume of hydraulic fluid therein increases, thus creating tension in the expandable bellows. The tension in the expandable bellows causes the bellows to recoil, returning the hydraulic fluid to its starting position.

In some examples, one or more energy conversion mechanisms 132 of the same kind or of different kinds can be deployed within a single energy harvesting system 100. For instance, each energy conversion mechanism 132 can operate at a different specification (such as pressure, resistance level, or dimension) in order to accommodate a wider range of vehicle weights. In some examples, an energy harvesting system 100 could have a single hydraulic impeller 192 installed in the central section 140 of the mat 120 to receive the hydraulic fluid pushed out of the hydraulic channels 122 on both the right and left peripheral sections 142 of the mat 120 and to pass the hydraulic fluid into the hydraulic accumulator 128. In some examples, an energy harvesting system 100 can have several, for example three, hydraulic impellers 192 installed in series or in parallel, with each operating at different specifications. For example, each of the three impellers 192 can be a different size (e.g., one large, one medium, and one small) to create different rotation speeds and resistance as the hydraulic fluid flows through each of the three impellers. In some examples, an energy harvesting system 100 can have multiple impellers (e.g., three impellers) all of the same size but each tuned to operate at a different pressure or level of resistance, such that for most light-duty passenger vehicles only a single impeller is activated (the low-pressure impeller), and controls or triggers can engage the higher pressure impellers as larger and heavier vehicles drive over the energy harvesting system to maximize energy output. In these examples, a sensor can be installed on the road, for example, 50 feet before the energy harvesting system, or a pressure gauge or weight sensor can be embedded in the energy harvesting system itself. The sensor or gauge can detect the higher weight of, for example, a tractor-trailer in comparison to a light duty passenger vehicle and send a signal to cause a change in the flow through the impellers. For instance, a valve can be opened to allowing the hydraulic fluid to pass from the first, low pressure impeller, into a second, higher pressure and higher energy potential impeller, or from the hydraulic channels directly into the second impeller while bypassing the first impeller. Deploying multiple energy conversion mechanisms in the energy harvesting system can help to increase the overall operating efficiency of the energy harvesting system.

In some examples, the energy harvesting system 100 can include a single energy conversion mechanism 132 that receives hydraulic fluid from both the left and right peripheral sections 142 of the mat 120. In some examples, the energy harvesting system can include an energy conversion mechanism for each side of the mat. Deploying a dedicated energy conversion mechanism for each side of the mat 120 can lead to higher efficiency or better responsiveness, e.g., if a vehicle does not drive over both sides of the mat simultaneously. For example, if a vehicle approaches the mat at an angle or while turning, either the tires on one side of the vehicle (e.g., the left side tires) may come into contact with the mat 120 before the tires on the other side (e.g., the right side). With only a single energy conversion mechanism, this lack of coordination between left and right sides can potentially create an imbalance between the pressure levels of the hydraulic channels on either side of the mat and inconsistent timing in actuating various components, resulting in lower overall system efficiency.

Energy-Generation System

The torque and angular displacement created by the energy conversion mechanism 132 drives the energy generation system to generate electricity. In some examples, the energy generation system can be mechanically connected to the energy conversion mechanism 132 by an axle that transfers the torque and angular displacement created by the energy conversion mechanism 132 to the energy generation system. In some examples, the energy generation system can be mechanically connected to the energy conversion mechanism 132 by two or more axles connected by gears, pulleys, or other parts.

Figure 19A:
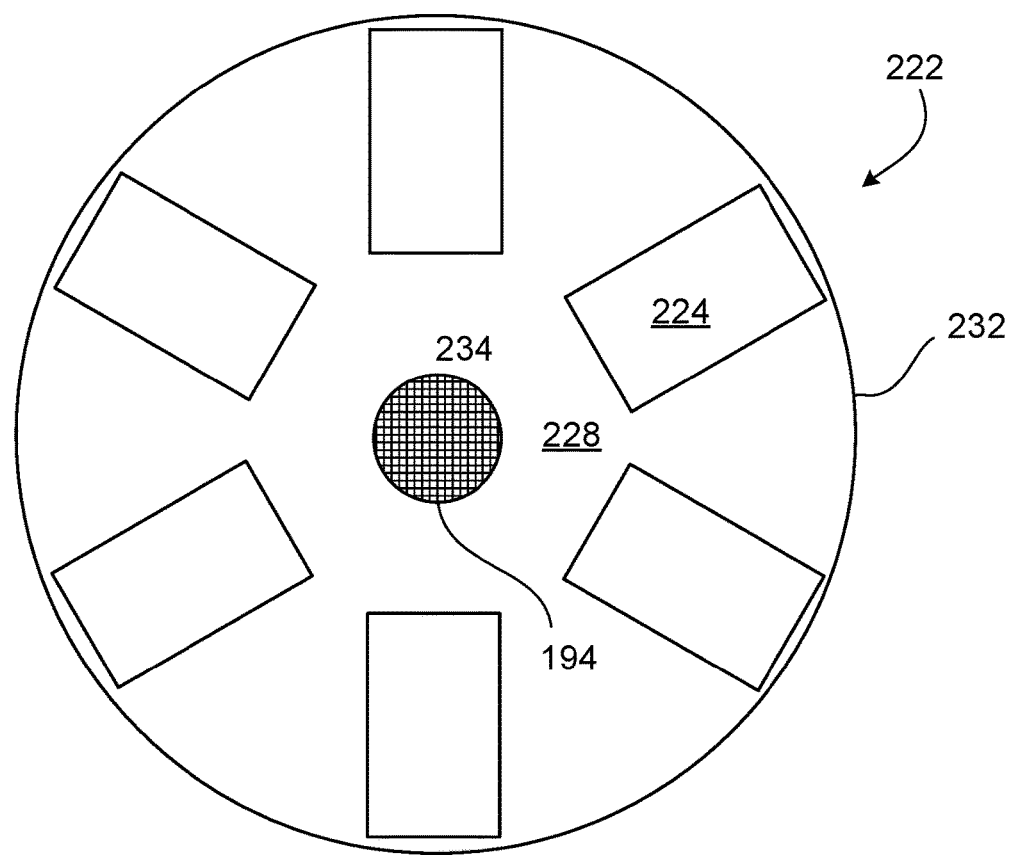
FIGS. 19A and 19B are diagrams of a generator.
Figure 19B:
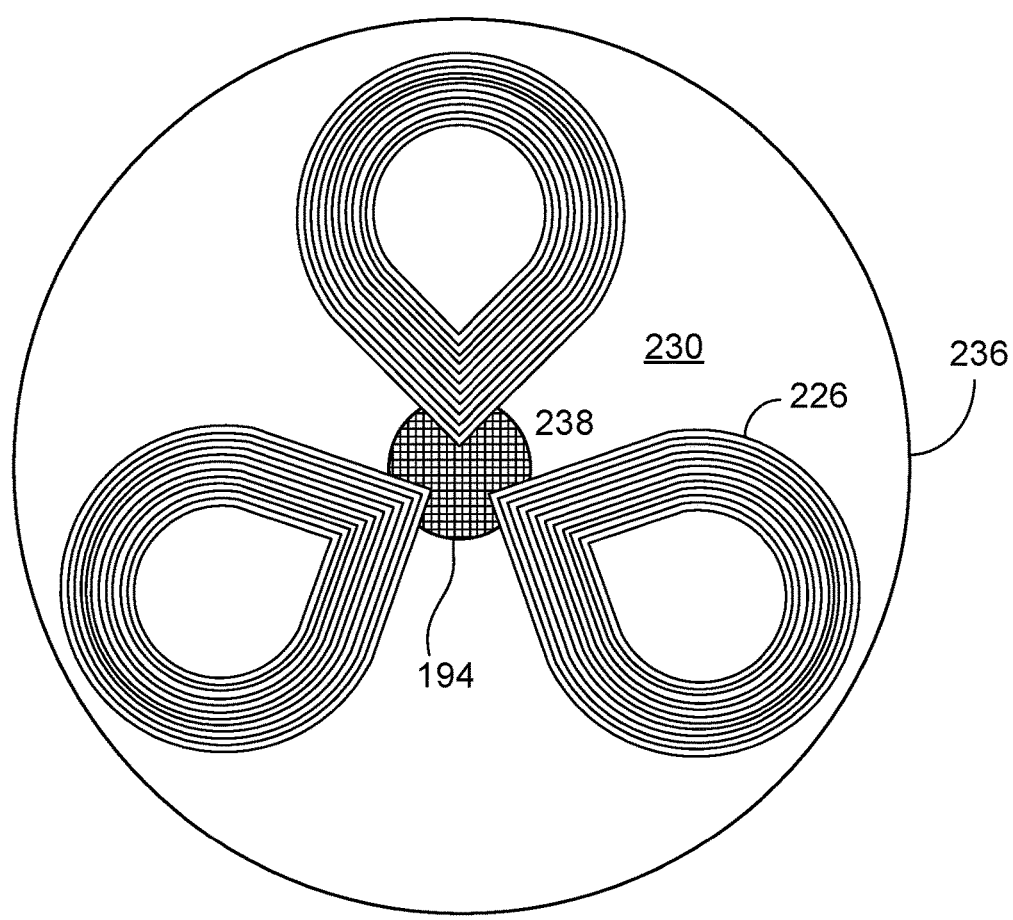

Referring to FIGS. 19A and 19B, the energy generation system can include a generator 222 that includes one or more rotating elements. The generator can allow for the continuous rotation of magnets 224 over metallic coils 226 or vice versa, in close proximity to one another, to generate magnetic fields used for electricity generation.

The generator 222 can fit within the low height profile of the central section 140 of the mat 120. For instance, the generator 222 can be an axial generator, sometimes also called a pancake generator. The axial generator 222 includes two flat circular plates 228, 230 that serve as the top and bottom of the generator 222, respectively, and as the bases for the magnets 224 and metallic coils 226. The magnets 224 can be magnets of different shapes, sizes, and strength. The metallic coils 226 can be made of copper or other similar wire and of various gauges and can connected electrically to components that can manage, store, or distribute the electricity generated by the generator 222.

The plates 228, 230 can be secured in place in close proximity to one another, for example so that the adjacent edges of the plates 228, 230 are between about a few millimeters to about ¼ inch apart. The plates can be coated, e.g., to protect against abrasion to facilitate electrical conductance, or to achieve other characteristics. The plates 228, 230 can be made of various materials, such as metals like steel or aluminum, hard or lightweight plastics, or light and durable rubber polymers, or other materials. Each plate 228, 230 can have a diameter of about 3 inches to about 12 inches, e.g., about 6 inches. The plates 228, 230 can be flat and compact, with a height of about ¼ inch to about 2 inches, e.g., about ½ inch.

In some examples, the plates 228, 230 can be oriented horizontally relative to the bottom surface 138 of the mat 120 and mounted on top of the energy conversion mechanism 132, such that the same axle that runs through the center of the energy conversion mechanism 132 (e.g., the axle 194 of the impeller 192) will also connect to and pass through the center of the generator plates 228, 230. In some examples, the plates 228, 230 can be mounted adjacent to the energy conversion system 160 within the central section 140 of the mat 120 and connected to the energy conversion mechanism 132 by pulleys or other mechanical connectors. For instance, one plate (e.g., the plate 228) can be mechanically connected to the energy conversion mechanism 132 (e.g., attached to the same axle 194) and will rotate upon rotation of the axle 194, as driven by the energy conversion mechanism 132. Depending on the end-to-end system specifications, the plate 228 can rotate at rates between 100 and 2,000 revolutions per minute. The second plate (e.g., the plate 230) can be stationary and secured in place by mechanical or adhesive connections or both, such that the elements attached to the first plate 228 will rotate and pass over the stationary elements attached to the second plate 230.

The characteristics of the magnets 224, such as the shape, size, material, orientation, strength, or another characteristic, or a combination of any two or more of them, can impact the magnetic fields, or magnetic flux, created when spinning the magnets over the metallic coils. In some examples six rectangular neodymium magnets 224, each about 1½-2 inches long, 1 inch wide, and ¼ inch thick, are distributed evenly along the circumference of the plate 228 and positioned closer to an outer edge 232 of the plate 228 (e.g., about ½ inch from the outer edge 232) than a center 234 of the plate 228 (e.g., about 1½ inches from the center 234). The dimensions of the magnets 224 can vary, for example, from about ½ inch to about 6 inches long, from about ¼ inch to about 3 inches wide, and from about ⅛ inch to about 1 inch thick. The magnets 224 can have any of a variety of shapes, such as rectangular, square, oblong, trapezoidal, keystone shaped, circular, or other shapes, or a combination of any two or more of them. Neodymium magnets come in different grades, such as N42, N52 or N42SH, and any of these grades can be used. Other types of magnets can be used. The magnets 224 can be secured in place (e.g., epoxied in place) so that the exposed magnet face is flush with the exposed surface of the epoxy.

The second plate 230 can three or more poles, or metallic wire coils 226, that can conduct electricity to a power electronics and distribution system, e.g., for use outside of the energy harvesting system 100. The poles can be oriented in a similar, mirrored way as the magnets 224 on the first plate 228. For instance, the poles 226 can be mounted and distributed evenly around the circumference of the plate, closer to an outer edge 236 of the plate 230 than a center 238 of the plate 230. The poles 226 can be formed from wound metallic wire, for example 30 gauge copper wire, and can include various numbers, shapes, and sizes of coils. In some examples, three poles are each composed of 100 oval- or tear-shaped coils of 30 gauge copper wire (by an oval-shaped coil, we mean 30 gauge copper wire is wrapped 100 times in an oval shape, either around a solid core made of plastic, metal, or wood, or another material, or leaving a hollow core in the middle). The material or gauge or both of the wires can be varied. For instance, 20 gauge copper wire can be used. A higher gauge corresponds to a thinner wire, which can increase voltage and impact the resulting magnetic flux. In some examples, all poles (e.g., all six poles) can be electrically connected by a single wire, which can extend off of the plate to create a positive and negative pole connected to the components of the power electronics system.

The energy generation system can be connected to a power electronics system that includes components to manage and distribute the electricity generated. The components can include an AC circuit breaker, a PWM rectifier, a DC to DC combiner, a DC disconnect, a charge controller, a digital amp meter monitor and digital volt meter, a battery bank, a battery-based inverter, or wire connecting all components, or other components, or a combination of any two or more of them. Examples of specific components that may be used include a MDS100A bridge rectifier three phase diode 100A 1600 volt with fixing hole, a Hoffman 8"×8"×4" polyester Six Circuit 90 amp combiner box, a Xantrex C series charge controller, and a Trojan 6 V 225 amp hour battery T105 RE. The components can likely be housed in secure, sealed metal boxes external to the energy harvesting system. In some examples, some or all of the components can be housed in the central section of the mat.

Control and Data Systems

The energy harvesting system or some or all of its related components, parts, and materials, may be subject to advanced control, as described previously and in the following sections, by analog or digital sensors, gauges, actuators, valves, or other electromechanical triggers. For instance, the controls can help to improve the energy efficiency of the operation of the energy harvesting system.

In some examples, sensors can be installed in a roadway before the energy harvesting system (e.g., 50 feet or more before the harvesting system) to record vehicle weight, speed, or other characteristics. The operating specifications of the energy harvesting system can be adjusted based on the characteristics of the approaching vehicle in order to improve or maximize output. In some examples, sensors embedded in the first of a series of energy harvesting systems can capture vehicle characteristics such that the operating specifications of the following energy harvesting systems in the series can be adjusted according to the vehicle characteristics. In this way, a single energy harvesting system or the aggregated installation may have the ability to self-regulate and adjust system specifications, for example hydraulic operating pressure, to adapt to varying vehicle characteristics and roadway conditions in real time. In some examples, pressure gauges or sensors can be used to determine certain vehicle characteristics for an approaching vehicle. Internal hydraulic fluid flow can be directed to the appropriate energy conversion mechanism (e.g., for an end-to-end system having multiple energy conversion mechanisms) in order to increase or maximize the energy absorbed for the approaching vehicle. Sensor data can be used to determine configuration adjustments to the nozzle creating the jet stream that powers the impeller within the energy conversion mechanism. For example, variables such as nozzle orientation, angle, jet stream characteristics, or other variables that impact hydraulic fluid flow and energy conversion performance can be adjusted based on the sensor data. This level of control can enable a high level of performance with the same energy harvesting system across a wide range of vehicle types and conditions.

In some examples, the rest hydraulic pressure can be progressively increased from one energy harvesting system to the next in an energy harvesting assembly to increase resistance to passing vehicles, thus increasing or maximizing the energy captured over the entire installation. For instance, dynamically controlling the pressure differential between adjacent energy harvesting systems, between the first and last energy harvesting systems, or both, can result in higher overall installation efficiencies, smoother driver experiences, and increased or maximized energy output.

Sensors or controls in the power electronics system can enable power distribution management such as efficient management of power distribution to outside loads or to a battery bank or determining when to store power in batteries, when to send power to outside loads, and when to send power directly from the energy harvesting system to the loads. Computer operated processors can collect data from the energy harvesting system, the battery bank, or outside loads, or a combination of any two or more of them to manage the power distribution. This type of computer-operated command can trigger actions such as safety shut-downs of the end-to-end system in the case of an emergency or other failure.

The end-to-end system can be equipped with communications or spatial locating mechanisms, such as integrated wireless communication systems (e.g., Wi-Fi or cellular communications systems), RFID, or other data processing and geolocation tagging devices. Through the communications mechanism, the performance of the energy harvesting system can be monitored remotely, data can be communicated to central computers for collection or management, control mechanisms can be actuated, or other activities. The data collected by the end-to-end systems may serve not only as a useful basis by which to improve or optimize system performance and efficiency, but also as useful information regarding traffic flows, vehicle types, and roadway conditions, e.g., when data is aggregated across many deployed energy-harvesting systems. For example, the energy generation profile (curve) created by each vehicle or even axle passing over the energy harvesting system, in combination with other sensor data, can be used to deduce vehicle classification and information such as vehicle count, speed, weight, or size. The software and firmware controlling this process and data transfer may use machine learning capabilities to improve the automatic deductive reasoning as more vehicles pass over the energy harvesting systems. The collected or deduced data may have commercial and civic value.

The data management systems can include sensor electronics, microcontrollers, webserver endpoints, and front end data management. In some examples, the data management systems can measure current coming out of the generator, store the data on an SD or other memory card, and push the data to a remote database (e.g., a web server). The data can be viewed on a static web page or reconfigured for digital displays at installation sites showing real-time energy statistics or for web-accessible user dashboards. The data management systems provide the ability to continuously monitor each site, store these readings in a centralized location, and extract information for various purposes. Applications of the data can include, e.g., remote maintenance diagnostics, real time displays for sites, real time internal analytics, or a set of auxiliary applications with the aid of machine learning, or a combination of any two or more of them. These auxiliary applications can include, e.g., traffic counting, vehicle weighing, vehicle classification by energy profile, or in-depth system modeling for improved maintenance diagnostics, or a combination of any two or more of them.

Hardware can include circuitry to measure current in an electrically isolated and safe manner, output the current as a voltage signal, and read the voltage signal into a microcontroller (e.g., an Arduino™ board). A test system can be developed to source some amount of current from any battery pack or other power source with a female output connector (adjustable by swapping the current-limiting resistor as needed), which can be used for testing the performance of the current sensing circuitry. The same test system can be used for building an electrically isolated method of measuring voltages, and testing the performance of these systems in parallel. External input controls (e.g., buttons) can be installed to trigger various functions within the microcontroller over software. These buttons can manually source current from the test system, send a signal to the microcontroller which can instruct the microcontroller, for example, to temporarily change the rate of sampling, and send a signal to the microcontroller to tell the microcontroller to pause data collection. Programming can cause the last button to terminate data collection, write data to SD card, and send the contents of the SD card over to the server.

Onboard the microcontroller, code can be capable of converting the hardware signal into a digital value, and storing the digital value into an SD card. The code can be capable of safely terminating data collection so that the microcontroller can be reset (e.g., using a reset button on the microcontroller), writing sensor data to an SD card when the data arrives, and taking some or all of the contents of the SD card and transmitting them to the server. The software can operate like a state machine: the program can be in various states (or "modes"). For example, the modes can be "collect data", "rest temporarily", and "termination", and the writing of SD card contents can occur during termination. The code can include the ability to fetch the real world time from a network time protocol (NTP) server, updating the system time to the real world time, which can occur on startup or at another time.

The data management system can include a fully operational server endpoint, which can receive data from the microcontroller and log the data to a remote database. This server endpoint can run as a cloud instance. A webpage can display some or all of the information in the remote database, e.g., in a simple table format. The webpage can be simple to modify in order to display the data in an appealing format for signs and monitors. A remote database can run as a cloud instance separate from the server endpoint.

Additional description of energy harvesting can be found in U.S. Pat. No. 8,344,529; US Patent Publication No. 2013/0211605; and U.S. Patent Publication No. 2013/0173443, the contents of all of which are incorporated here by reference in their entirety.

Other implementations are also within the scope of the following claims.

What is claimed is:

1. An apparatus comprising
a housing having a top surface and a bottom surface,
a structure to receive kinetic energy from a wheel of a vehicle or a foot of a pedestrian, the structure forming at least part of the top surface of the housing,
an energy converter disposed in an interior of the housing, and
a hydraulic system to transfer the received energy to the energy converter, in which the hydraulic system is disposed in the interior of the housing, the hydraulic system comprising elongated, compressible hydraulic channels, the channels being arranged side-by-side across at least a portion of a width of the housing, and a length of the channels being parallel to the top surface of the housing; wherein,
a top surface of each compressible hydraulic channels is defined by a portion of the top surface of the housing, and a bottom surface of each compressible hydraulic channels is defined by a portion of a bottom surface of the housing and a side wall of each compressible hydraulic channel is defined by a vertical wall connecting the top surface of the housing to the bottom surface of the housing.

2. The apparatus of claim 1 in which the energy converter is configured to convert energy carried by hydraulic fluid of the hydraulic system into a different form of energy.

3. The apparatus of claim 2 in which the different form of energy comprises mechanical motion.

4. The apparatus of claim 2 in which the energy converter is configured to convert the different form of energy into electricity.

5. The apparatus of claim 1 in which the energy converter comprises at least one of a turbine, an impeller, and axial generator, a gerotor, a dual-action linear hydraulic piston, and an expandable bellows.

6. The apparatus of claim 1 comprising a control system, in which the control system comprises:
sensors that sense at least one of weight and speed of the vehicle or pedestrian; and
electronics that receive signals from the sensors and issue signals to control operation of at least one of the energy converter and the hydraulic system.

7. The apparatus of claim 1 comprising wireless communication facilities to communicate information associated with the operation of the energy converter or the hydraulic system or both to or from at least one of sensors configured to sense data associated with operation of the apparatus, wireless data transmission devices, a remote server, a remote computing device, a real time data dashboard, and a computing device configured to analyze data associated with operation of the apparatus.

8. The apparatus of claim 1 comprising an interface configured to transmit data to or receive data from at least one of a remote server, a remote controller, and a remote performance monitor.

9. The apparatus of claim 1 in which the energy converter comprises a rotating element coupled to an electric generator.

10. The apparatus of claim 1 in which the energy converter comprises a linear motion element coupled to an electric generator.

11. The apparatus of claim 1 in which the energy converter comprises two or more energy conversion units in parallel or in series relative to the hydraulic system.

12. The apparatus of claim 11 in which the energy conversion units operate respectively with different operating characteristics; and in which the apparatus comprises a sensor to determine a characteristic of the vehicle or the pedestrian and provide a signal indicative of which energy conversion unit or units to activate.

13. The apparatus of claim 1 in which the energy converter comprises elements to adjust the energy conversion structure dynamically to effect changes in operating characteristics.

14. The apparatus of claim 1 in which the energy receiving structure comprises a surface on which the wheel of the vehicle or the foot of the pedestrian makes contact.

15. The apparatus of claim 1 in which the hydraulic channels contain hydraulic fluid and have one end configured to enable hydraulic fluid to apply a force to cause motion of the energy converter.

16. The apparatus of claim 1 in which the hydraulic channels contain hydraulic fluid and have one end configured to apply force to the hydraulic fluid in response to the kinetic energy received from the wheel of the vehicle or the foot of the pedestrian.

17. The apparatus of claim 1 in which the hydraulic channels containing pressurized hydraulic fluid are arranged so that the wheel of the vehicle or the foot of the pedestrian causes the hydraulic fluid to be pumped from an upstream end of the channels to a downstream end of the channels in a direction in which the vehicle or pedestrian is traveling,
in which each of the hydraulic channels extends in the direction in which the vehicle or pedestrian is traveling.

18. The apparatus of claim 1 comprising:
an inlet port having a one way valve for adding hydraulic fluid to the channels; and
a drain port having a one way valve for draining fluid from the channels.

19. The apparatus of claim 1 in which the hydraulic system comprises a hydraulic shuttle path along which hydraulic fluid flows back and forth between two endpoints, in which the second endpoint comprises a device configured to receive the hydraulic fluid and in which the first endpoint comprises ends of the compressible channels.

20. The apparatus of claim 1 in which adjacent channels are separated by the vertical walls, in which the vertical walls begin at first ends of the channels and seal the first ends of the channels from one another, and in which the vertical walls end at a location spaced apart from second ends of the channels to enable hydraulic fluid to flow between the channels at the second ends.

21. The apparatus of claim 20 in which the vertical walls are configured to bend when a force is applied to an upper surface of the apparatus, and in which the channels are configured to undergo complete collapse of the chamber under the force of the vehicle or the pedestrian.

22. The apparatus of claim 1 in which each of the channels is partitioned vertically into a stack of sub-channels.

23. The apparatus of claim 1 in which each of the channels comprises transverse features configured to tend to maximize the flow of hydraulic fluid toward the energy converter.

24. The apparatus of claim 1 in which the hydraulic system comprises a sealed recirculation system containing hydraulic fluid and configured to apply force to the hydraulic fluid in response to kinetic energy received from the wheel of the vehicle, to enable the hydraulic fluid to apply a corresponding force to cause motion of the energy converter, and to recirculate hydraulic fluid that has applied the force to cause the motion of the energy converter so that the sealed recirculation system can again apply force to the hydraulic fluid in response to kinetic energy received from the wheel of the vehicle or a wheel of another vehicle.

25. The apparatus of claim 1 in which the hydraulic system comprises a path having a first end and a second end, the path being sealed at both the first second ends and the energy converter is either (i) at a location along the path between the first and second ends or (ii) at one of the first end or the second end of the path.

26. The apparatus of claim 1 comprising two or more modular units connected electrically to one another and together connected by a single electrical connection to a load, in which the two or more modular units are not connected hydraulically to one another.

27. The apparatus of claim 1 comprising a mat, in which the mat comprises an external surface exposed to the environment and internal chambers to house the energy converter and the hydraulic system.

28. The apparatus of claim 27 in which the mat is formed of a flexible, non-elastic, and waterproof material.

29. The apparatus of claim 1 in which the structure to receive the kinetic energy is configured to be compressed by the wheel of the vehicle or the foot of the pedestrian and thereafter to rebound before a wheel of another vehicle or another foot of a pedestrian causes the structure to be compressed.

30. An apparatus comprising,
a set of modular energy conversion units, each having a structure to receive kinetic energy from a wheel of a vehicle or a foot of a pedestrian, the structure of each modular energy conversion unit forming at least part of a top surface of the modular energy conversion unit, and a set of energy harvesting systems, each energy harvesting system being disposed in an interior of a corresponding one of the modular energy conversion units, to convert the kinetic energy to electricity to be delivered to an electrical interface, each energy harvesting system including:
an energy converter, and
a hydraulic system to transfer the received energy to the energy converter, the hydraulic system comprising elongated, compressible hydraulic channels, the channels being arranged side-by-side across at least a portion of a width of the interior of the corresponding modular energy conversion unit, and a length of the channels being parallel to a top surface the corresponding modular energy conversion unit, and
a top surface of each compressible hydraulic channels is defined by a portion of the top surface of a housing, and a bottom surface of each compressible hydraulic channels is defined by a portion of a bottom surface of the housing, and a side wall of each compressible hydraulic channel is defined by a vertical wall connecting the top surface of the housing to the bottom surface of the housing; and, the electrical interface of the units are coupled in order to provide electricity to a load.

31. An apparatus comprising
a travel surface along which a vehicle having a wheel or a pedestrian can travel,
the travel surface including an energy receiving surface over which the wheel or a foot of the pedestrian passes as the vehicle or pedestrian travels along the travel surface, the energy receiving surface an energy harvesting system that receives kinetic energy from the wheel and hydraulically transfers the kinetic energy to an energy converter for conversion to motion of the energy converter, the energy converter disposed below the travel surface in an interior of the energy harvesting system,
the energy harvesting system including elongated, compressible hydraulic channels, the channels being arranged side-by-side across at least a portion of a width of the interior of the energy harvesting system, and a length of the channels being parallel to the energy receiving surface; wherein,
a top surface of each compressible hydraulic channels is defined by a portion of the top surface of a housing, and a bottom surface of each compressible hydraulic channels is defined by a portion of a bottom surface of the housing, and a side wall of each compressible hydraulic channel is defined by a vertical wall connecting the top surface of the housing to the bottom surface of the housing.

32. The apparatus of claim 31 in which the travel surface is on pavement and in which the energy harvesting system comprises a mat bearing the energy receiving surface and embedded in the pavement or disposed on the pavement, another part of the hydraulic system and the energy converter being separately embedded in the pavement or disposed on the pavement.

* * * * *